(12) United States Patent
Kikugawa

(10) Patent No.: US 11,422,757 B2
(45) Date of Patent: Aug. 23, 2022

(54) IMAGE FORMING APPARATUS INCLUDING WIRELESS OPERATION UNIT

(71) Applicant: CANON KABUSHIKI KAISHA, Tokyo (JP)

(72) Inventor: Makoto Kikugawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/511,398

(22) Filed: Oct. 26, 2021

(65) Prior Publication Data
US 2022/0137894 A1    May 5, 2022

(30) Foreign Application Priority Data

Oct. 29, 2020    (JP) .............................. JP2020-181045

(51) Int. Cl.
*G06F 3/12* (2006.01)
*H04W 84/12* (2009.01)

(52) U.S. Cl.
CPC .......... *G06F 3/1221* (2013.01); *G06F 3/1229* (2013.01); *G06F 3/1292* (2013.01); *G06F 3/1293* (2013.01); *H04W 84/12* (2013.01)

(58) Field of Classification Search
CPC .... G06F 3/1221; G06F 3/1229; G06F 3/1292; G06F 3/1293; H04W 84/12
USPC ....................................................... 358/1.15
See application file for complete search history.

(56) References Cited

U.S. PATENT DOCUMENTS

| 2011/0007349 | A1* | 1/2011 | Takenaka ........... H04N 1/00896 358/1.15 |
| 2014/0085655 | A1 | 3/2014 | Matsubara |
| 2014/0160517 | A1* | 6/2014 | Masuyama ........... G06F 3/1221 358/1.14 |
| 2017/0197444 | A1* | 7/2017 | Hosokawa ................. B41J 3/36 |

FOREIGN PATENT DOCUMENTS

| JP | 2014063404 A | 4/2014 |
| JP | 2017144627 A | 8/2017 |

* cited by examiner

*Primary Examiner* — Allen H Nguyen
(74) *Attorney, Agent, or Firm* — Canon U.S.A., Inc. I.P. Division

(57) ABSTRACT

In a state in which wireless communication with a wireless operation device is disconnected, an instruction cannot be issued from the wireless operation device to an image forming apparatus main body. Thus, if the image forming apparatus main body enters a sleep mode, for example, an instruction for shifting the image forming apparatus main body from the sleep mode to a standby mode cannot be issued from the wireless operation device. In standby mode, a power source is controlled to supply power to an image forming unit and a wireless communication unit; in light sleep mode, the power source is caused not to supply power to the image forming unit and supply power to the wireless communication unit; and in deep sleep mode, the power source is caused not to supply power to the image forming unit and the wireless communication unit.

11 Claims, 20 Drawing Sheets

FIG.20

| | | STANDBY MODE | POWER SAVING MODE | LIGHT SLEEP MODE | DEEP SLEEP MODE |
|---|---|---|---|---|---|
| POWER DEVICE | FIRST POWER DEVICE | ○ | ○ | ○ | ○ |
| | SECOND POWER DEVICE | ○ | ○ | × | × |
| FIRST CONTROLLER | CPU | ○ | ○ | × | × |
| | NETWORK CONNECTION UNIT | ○ | ○ | ○ | ○ |
| | WIRELESS COMMUNICATION UNIT | ○ | ○ | ○ | × |
| SECOND CONTROLLER | CPU | ○ | × | × | × |
| | STORAGE UNIT | ○ | ○ | × | × |
| | ENGINE CONTROL UNIT | ○ | ○ | × | × |
| | PRINTER UNIT | ○ | × | × | × |
| | DOCUMENT CONVEYANCE DEVICE | ○ | × | × | × |
| | DOCUMENT READING DEVICE | ○ | × | × | × |
| | POSTPROCESSING DEVICE | ○ | × | × | × |
| FIXED OPERATION UNIT | DISPLAY PANEL | ○ | × | × | × |
| | TOUCH PANEL | ○ | ○ | ○ | ○ |
| | HARDWARE KEY | ○ | ○ | ○ | ○ |

IMAGE FORMING APPARATUS INCLUDING WIRELESS OPERATION UNIT

BACKGROUND

Field

The present disclosure relates to an image forming system including an image forming apparatus such as an electrophotographic copying machine and an electrophotographic printer (e.g., laser beam printer, and a light-emitting diode (LED) printer), and a postprocessing device.

Description of the Related Art

There has been widely known a configuration of an image forming apparatus including a display unit for displaying an image, and an operation unit for inputting information. Such an image forming apparatus includes an operation unit, and a user can make settings regarding image formation, such as a size of a sheet on which an image is to be formed, and the number of sheets on which images are to be formed, by operating the operation unit.

Furthermore, a configuration for operating an image forming apparatus using a mobile terminal such as a smartphone and a tablet terminal, via wireless communication has become common. A United States patent application with Publication Number US2014/0085655 discusses a configuration that can wirelessly connect a mobile terminal and an image forming apparatus, and display the same screen as a screen of an operation unit of the image forming apparatus, on the mobile terminal.

Typically, an image forming apparatus can enter a plurality of power saving states with differing degrees of power savings. The image forming apparatus discussed in US2014/0085655 includes, for example, a standby mode, a light sleep mode in which power consumption is smaller than that in the standby mode, and a deep sleep mode in which power consumption is smaller than that in the light sleep mode, as a plurality of available types of power saving states.

Nevertheless, power is constantly supplied to a wireless communication unit that performs wireless communication with a mobile terminal, for accepting wireless communication from the mobile terminal, despite which of these power saving states the image forming apparatus is in. In other words, as long as power is supplied to the wireless communication unit, the image forming apparatus consumes at least the power supplied to the wireless communication unit.

SUMMARY

According to one embodiment, an image forming apparatus includes an image forming unit configured to form an image onto a sheet, receives an execution signal for causing the image forming unit to execute image formation, and the image forming apparatus is shiftable to a standby mode being a power state in which image formation is executable in accordance with reception of the execution signal, a light sleep mode in which power consumption is smaller than that in the standby mode, and a deep sleep mode in which power consumption is smaller than that in the light sleep mode. The image forming apparatus further includes a wireless operation device configured to receive an operation performed by a user and wirelessly communicate with the image forming apparatus, a wireless communication unit configured to wirelessly communicate with the wireless operation device, a power source configured to supply power to the image forming unit and the wireless communication unit, and a power control unit configured to be driven by power supplied from the power source, and control supply of power from the power source to the image forming unit and the wireless communication unit. In a case where the image forming apparatus is in the standby mode or the light sleep mode, the power control unit causes the power source to supply power to the wireless communication unit. In a case where the image forming apparatus is in the deep sleep mode, the power control unit causes the power source not to supply power to the wireless communication unit.

According to one embodiment, an image forming apparatus includes an image forming unit configured to form an image onto a sheet, receives an execution signal for causing the image forming unit to execute image formation, and the image forming apparatus is shiftable to a standby mode being a power state in which image formation is executable in accordance with reception of the execution signal, and a light sleep mode in which power consumption is smaller than that in the standby mode. The image forming apparatus further includes a wireless operation device configured to receive an operation performed by a user and wirelessly communicate with the image forming apparatus, a wireless communication unit configured to wirelessly communicate with the wireless operation device, a power source configured to supply power to the image forming unit and the wireless communication unit, and a power control unit configured to be driven by power supplied from the power source, and control supply of power from the power source to the image forming unit and the wireless communication unit. In a case where the image forming apparatus is in the standby mode, the power control unit causes the power source to supply power to the image forming unit and the wireless communication unit. In a case where the image forming apparatus is in the light sleep mode, the power control unit causes the power source not to supply power to the image forming unit, and causes the power source to supply power to the wireless communication unit.

Further features of the present disclosure will become apparent from the following description of example embodiments with reference to the attached drawings.

BRIEF DESCRIPTION OF THE DRAWINGS

FIG. 20 illustrates a table listing types of components to be supplied with power from a power device, by various modes according to one embodiment.

DESCRIPTION OF THE EMBODIMENTS

The overall configuration of an image forming apparatus according to an example embodiment of the present disclosure will now be described with reference to the drawings together with an operation performed in image formation. The dimensions, materials, shapes, and relative arrangement of the components described below are not intended to limit the scope of the invention to those described example embodiments however, unless otherwise specified.

<Image Forming Apparatus>

Figure 1:
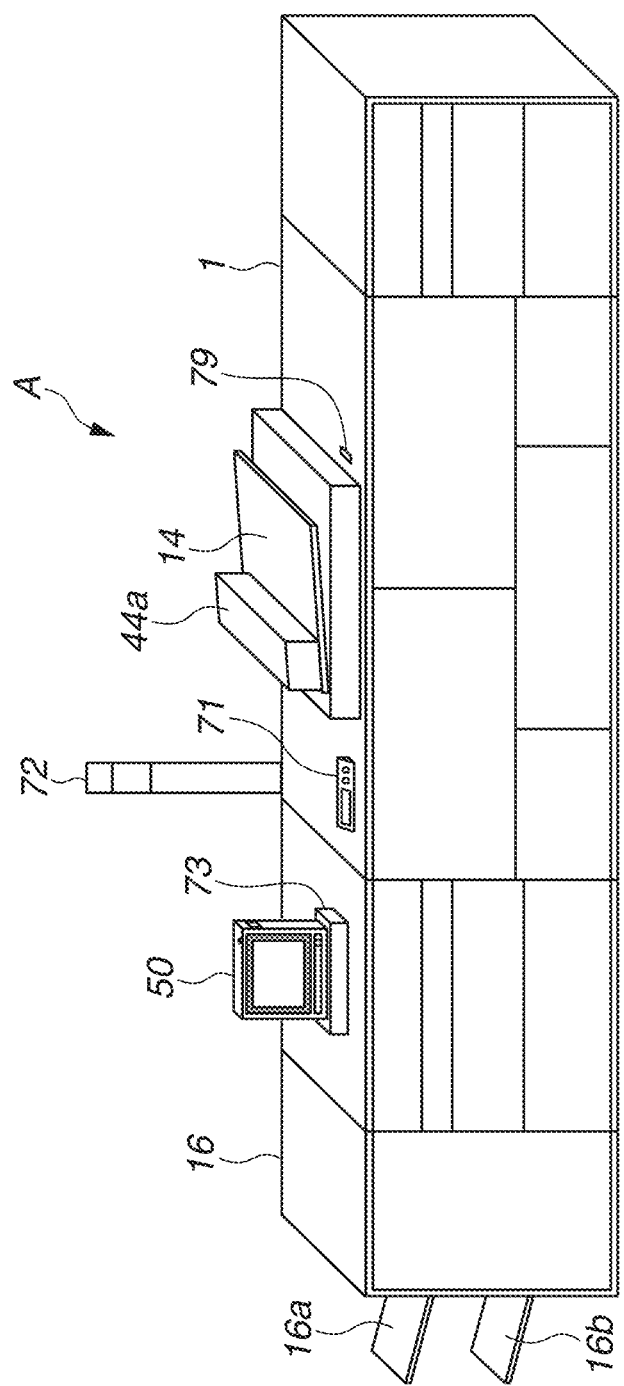
FIG. 1 is a perspective schematic diagram of an image forming system according to one embodiment.

FIG. 1 is a perspective schematic diagram of an image forming system A equipped with an image forming apparatus 1. As illustrated in FIG. 1, the image forming system A includes the image forming apparatus 1 that forms an image onto a sheet S, and a postprocessing device 16 that performs postprocessing, such as stapling processing, punching processing, and bookbinding processing on the sheet S on which an image has been formed by the image forming apparatus 1. On the top surface of the image forming apparatus 1, a document reading device 14 is provided. The document reading device 14 optically reads an image on a document placed on a glass surface (not illustrated), and converts the read image into image data.

The image forming apparatus 1 includes a seesaw-shaped power switch 79 that switches on and off of a main power source. The image forming apparatus 1 further includes a display panel 71a that announces to the user a state of the image forming apparatus 1, such as an executing state of image formation processing, a stopped state caused by an error, and a standby state, by lighting a lamp or displaying an error code. The image forming apparatus 1 further includes a tower-shaped lamp 72 that announces to the user existing at a distant position, a state of the image forming apparatus 1 by lighting, turning off, or blinking a light source.

The image forming apparatus 1 further includes a wireless operation unit 50 (e.g., wireless operation device, remote control unit, and remote control device). The wireless operation unit 50 is configured to be wirelessly communicable with the image forming apparatus 1, and is operable at a position distant from the image forming apparatus 1. If the wireless operation unit 50 is connected to a charging connector 55, a battery 57 (FIG. 5) of the wireless operation unit 50 is charged by power supplied from the image forming apparatus 1.

Figure 2A:
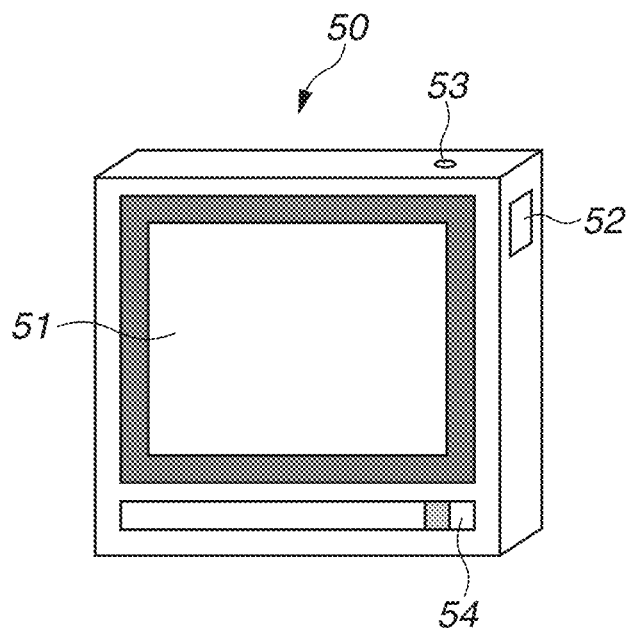
FIGS. 2A and 2B are perspective schematic diagrams of an image forming system according to one embodiment.
Figure 2B:
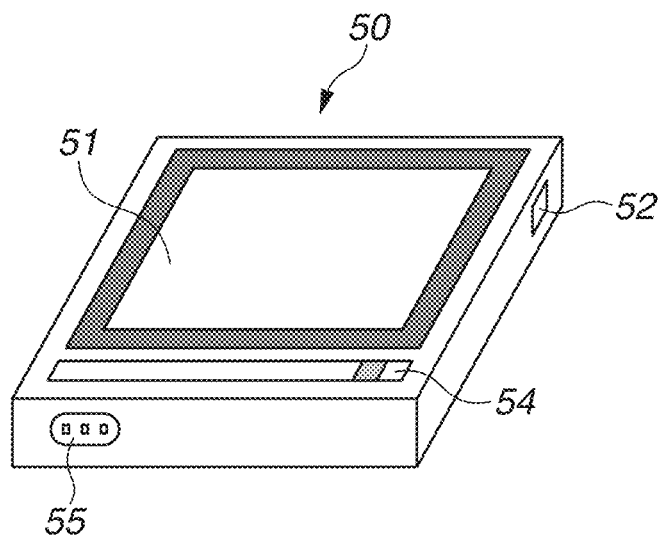

FIGS. 2A and 2B are perspective schematic diagrams of the wireless operation unit 50. As illustrated in FIGS. 2A and 2B, the wireless operation unit 50 includes a power switch 52 that switches on and off of the power of the wireless operation unit 50, a speaker unit 53 that outputs voice, and an illumination unit 54 that includes a light-emitting diode (LED) and announces a state of the wireless operation unit 50 by lighting, extinction, and blinking.

The wireless operation unit 50 further includes a touch panel type display 51 having an integrated function of a display unit that displays an image and an operation unit that can input information. The user inputs a numerical value by touching with a finger a key displayed on the display 51, and thereby the user can make settings regarding image formation, such as the number of sheets on which images are to be formed, and the size setting of the sheet S, and settings regarding image reading, such as the size setting of a document. In the present example embodiment, the configuration of the wireless operation unit 50 equipped with the touch panel type display 51 has been described. However, the present invention is not limited to this configuration. Hardware keys, such as a numerical keypad and a reset key, may be additionally provided as an operation unit for inputting information in other embodiments.

Figure 4:
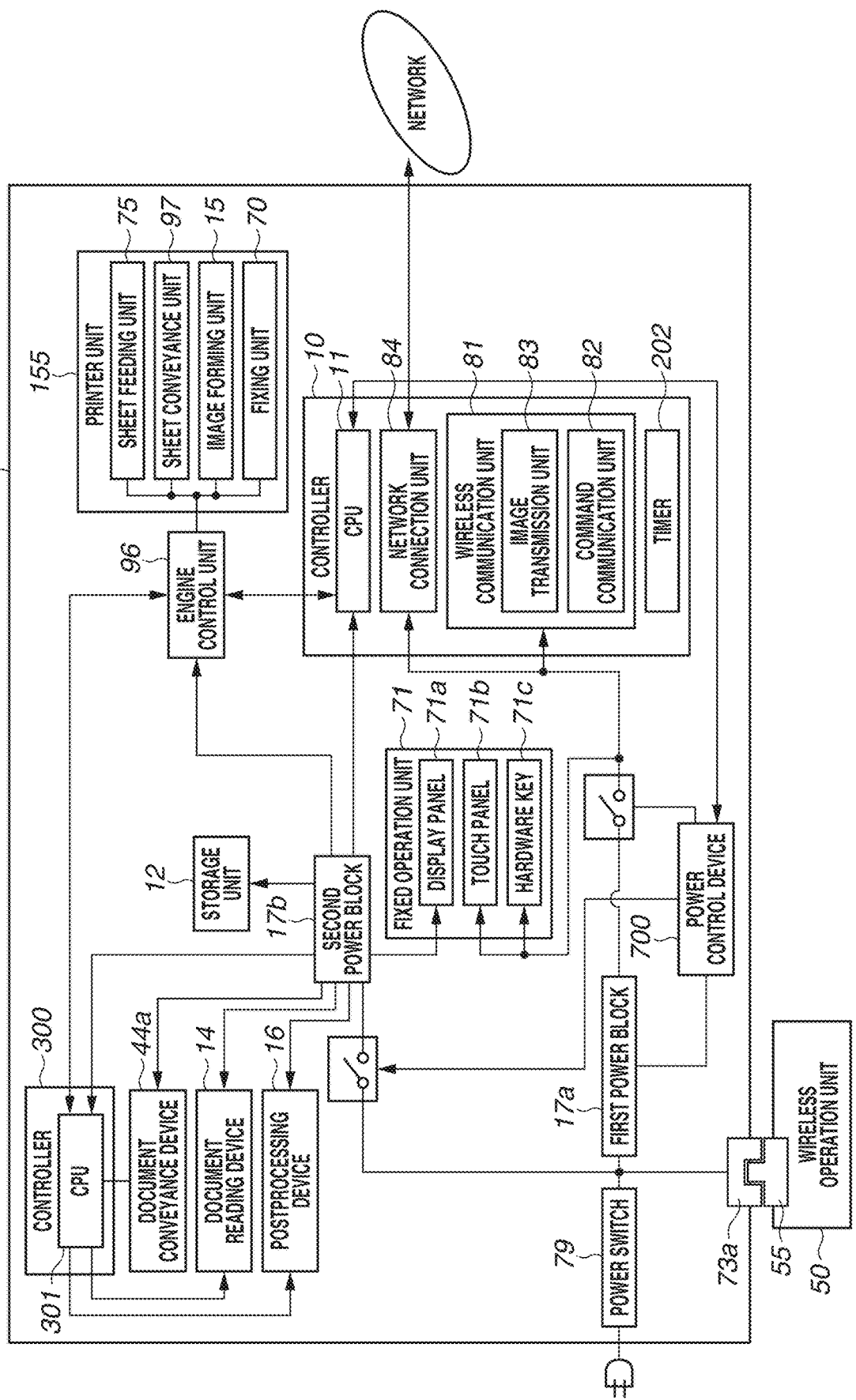
FIG. 4 is a block diagram illustrating a system configuration of an image forming apparatus according to one embodiment.

As illustrated in FIG. 4, a wireless communication unit 81 includes a command communication unit 82 (an example of transmission unit, receiving unit) and an image transmission unit 83. A central processing unit (CPU) 11 reads an image stored in a read-only memory (ROM) 12, and transmits the image to the wireless operation unit 50 via the image transmission unit 83 of the wireless communication unit 81. The CPU 11 generates an instruction for the wireless operation unit 50, and transmits the instruction to the wireless operation unit 50 via the command communication unit 82. The CPU 11 receives a notification or an instruction generated by the wireless operation unit 50 via the command communication unit 82. In the present example embodiment, the command communication unit 82 and the image transmission unit 83 have been described as separate components, but these units may be combined into one communication line.

The image forming apparatus 1 and the wireless operation unit 50 perform wireless communication by Wireless Fidelity (Wi-Fi) Direct communication, which is a communication configuration for directly establishing wireless connection between apparatuses. In other words, in this example, the image forming apparatus 1 and the wireless operation unit 50 wirelessly communicate with each other not via a server. The Miracast is a display transmission technique to which the system of the Wi-Fi Direct communication is applied, and the Miracast is used in a mobile phone, a display, a projector, and other devices. The system of wireless communication is not limited to Wi-Fi Direct communication. For example, wireless communication may be performed using a Wi-Fi router as an access point. Nevertheless, it is desirable to employ Wi-Fi Direct communication from the viewpoint of security. Alternatively, wireless communication may be performed using another system such as Bluetooth® or near field communication (NFC) instead of wireless communication that uses Wi-Fi.

"Remote access" is known as a method of accessing another electronic device or various servers existing in a remote place, from an electronic device such as a personal computer (PC) or a tablet terminal. Examples of configurations of remote access include a system called a virtual private network (VPN) system. The VPN is a structure for constructing a dedicated virtual network on the Internet. In this system, a method called "tunneling" for performing communication by constructing a virtual tunnel for data exchange is typically employed. Furthermore, a technique called "encapsulation" is used for protecting data from malicious invasion into the tunnel. The security is ensured in this manner. The communication method using the VPN system involves the Internet as described above, and thus the communication method is different from a method of communication between the wireless operation unit 50 and the image forming apparatus 1 in the present example embodiment.

There is also a method called a screen transfer system of transferring, via the Internet, a screen of a PC or tablet being a targeted electronic device, to a screen of an electronic device being operated. When the screen transfer is performed, VPN connection is established between electronic devices via a relay server.

Such so-called "remote access" is a concept different from the "wireless communication" described in the present example embodiment. In other words, the wireless operation unit 50 and the image forming apparatus 1 do not communicate with each other via a server nor the Internet.

Figure 3:
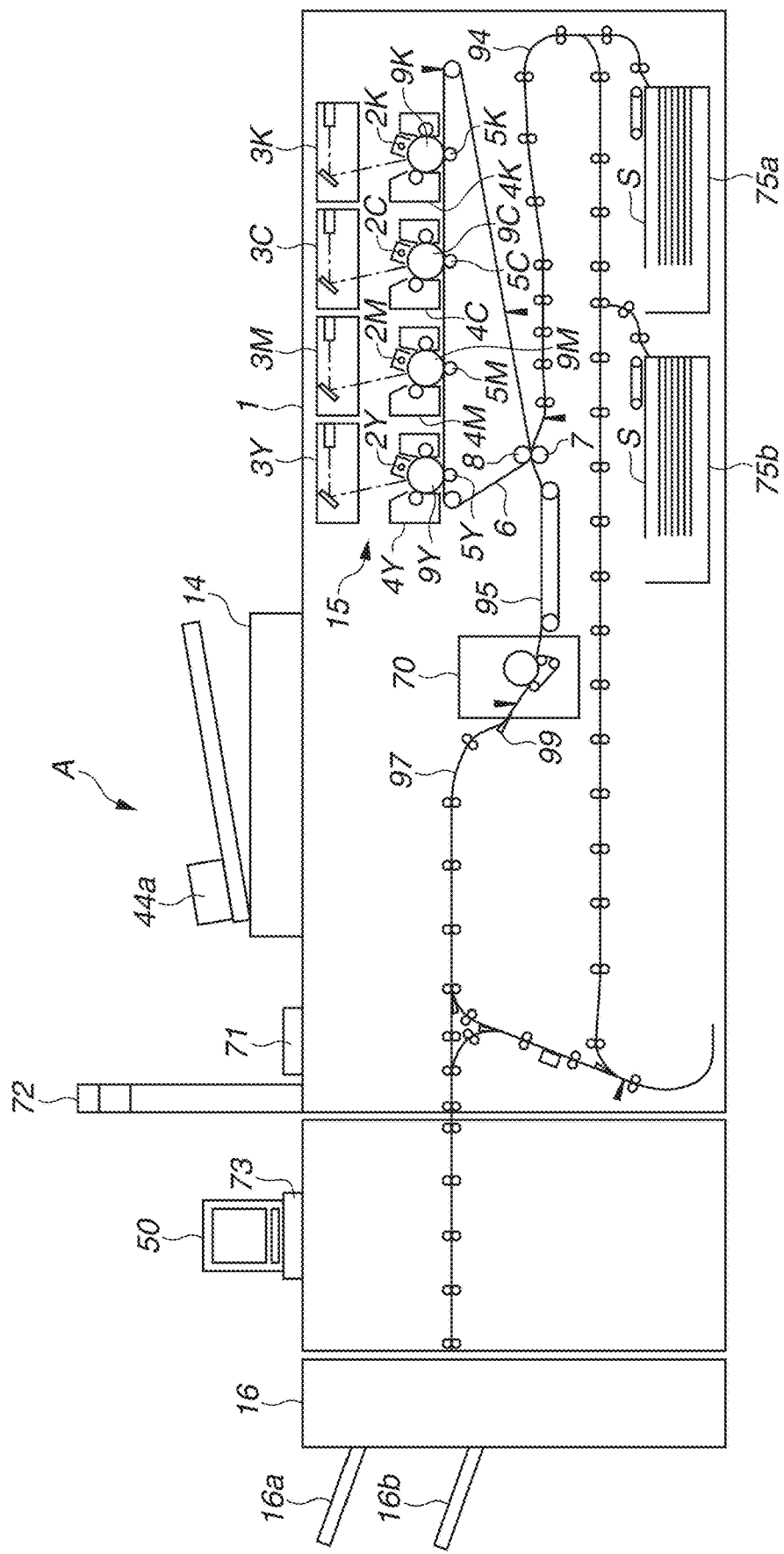
FIG. 3 is a cross-sectional schematic diagram of an image forming system according to one embodiment.

FIG. 3 is a cross-sectional schematic diagram of the image forming system A. As illustrated in FIG. 3, the image forming apparatus 1 includes an image forming unit 15 that forms an image onto the sheet S. The image forming unit 15 includes photosensitive drums 9Y, 9M, 9C, and 9K (hereinafter, also referred to as photosensitive drums 9), charging devices 2Y, 2M, 2C, and 2K (hereinafter, also referred to as charging devices 2), and development devices 4Y, 4M, 4C, and 4K (hereinafter, also referred to as development devices 4). The image forming unit 15 further includes primary transfer rollers 5Y, 5M, 5C, and 5K, laser scanner units 3Y, 3M, 3C, and 3K (hereinafter, also referred to as laser scanner units 3), an intermediate transfer belt 6, a secondary transfer roller 7, and a secondary transfer counter roller 8. When power is supplied to the image forming unit 15, power is supplied to a motor and a drive substrate for driving these components (the photosensitive drums 9, the charging devices 2, the development devices 4, the primary transfer rollers 5, the laser scanner units 3, the intermediate transfer belt 6, the secondary transfer roller 7, the secondary transfer counter roller 8). A state in which these components are not driven although power is supplied to these components can be considered to be a state in which power is supplied to the image forming unit 15.

When an image is to be formed by the image forming apparatus 1, first of all, an image formation job signal is input to a main control unit (controller) 10 illustrated in FIG. 4. A sheet S stored in either sheet cassette 75a or 75b is thereby sent to a conveyance path (sheet conveyance unit) 94. After that, the sheet S passes through the conveyance path (sheet conveyance unit) 94 and is sent to a secondary transfer portion formed by the secondary transfer roller 7 and the secondary transfer counter roller 8.

In contrast, in the image forming unit 15, the charging device 2Y charges the surface of the photosensitive drum 9Y. Thereafter, the laser scanner unit 3Y emits laser light onto the surface of the photosensitive drum 9Y in accordance with image data of a document read by the document reading device 14 or image data transmitted from an external device (not illustrated) via a network, and forms an electrostatic latent image onto the surface of the photosensitive drum 9Y.

The development device 4Y then causes yellow toner to adhere to the electrostatic latent image formed on the surface of the photosensitive drum 9Y, and a yellow toner image is formed on the surface of the photosensitive drum 9Y. The toner image formed on the surface of the photosensitive drum 9Y is primarily transferred onto the intermediate transfer belt 6 by a primary transfer bias being applied to the primary transfer roller 5Y.

By using similar processes, magenta, cyan, and black toner images are formed also on the photosensitive drums 9M, 9C, and 9K. These toner images are then transferred onto the yellow toner image on the intermediate transfer belt 6 in a superimposed manner, by a primary transfer bias being applied to the primary transfer rollers 5M, 5C, and 5K. A full-color toner image corresponding to an image signal is thereby formed on the surface of the intermediate transfer belt 6.

Thereafter, the full-color toner image is sent to the secondary transfer portion by the rotation of the intermediate transfer belt 6. The full-color toner image on the intermediate transfer belt 6 is then transferred onto the sheet S by a secondary transfer bias being applied to the secondary transfer roller 7 at the secondary transfer portion. The sheet S on which the toner image is transferred is conveyed to a fixing unit 70 by a conveyance belt 95. Heating and pressure application processing are then performed in the fixing unit 70, and the toner image is fixed onto the sheet S.

The sheet S on which the toner image is fixed passes through a conveyance path (sheet conveyance unit) 97, and is sent to the postprocessing device 16. In a case where the user designates postprocessing, such as stapling processing, punching processing, and bookbinding processing, the designated postprocessing is performed on the sheet S, which has been sent to the postprocessing device 16, and then the sheet S is discharged to a discharge tray 16a. In a case where the user does not designate postprocessing, the sheet S, which has been sent to the postprocessing device 16, is discharged as-is to a discharge tray 16b without being subjected to postproces sing.

<System Configuration of Image Forming Apparatus>

A system configuration of the image forming system A will now be described.

The image forming apparatus 1 includes the main control unit (controller) 10 serving as a first controller. The main control unit 10 controls operations of components included in the image forming apparatus 1. The components include a storage unit 12, a fixed operation unit (an example of fixed operation unit) 71, a document conveyance device 44a, the document reading device 14, the postprocessing device 16, an engine control unit 96, a printer unit 155, a network connection unit 84, and the wireless communication unit 81.

The main control unit 10 includes the CPU 11 serving as an example of a control circuit. The CPU 11 is an integrated circuit that performs processing and calculation related to the control of the image forming apparatus 1. The integrated circuit can also perform image processing necessary for printing on image data. The network connection unit 84 is a part of the main control unit 10. The network connection unit 84 is a block (communication block) collectively including circuits for communication. The network connection unit 84 includes hardware components, such as a chip, a memory, and a connector for communication. The network connection unit 84 performs wired communication with a computer (external terminal) such as a PC and a server. The network connection unit 84 receives print data from the computer. The print data includes data written in page description language, image data, and print setting data. The main control unit 10 controls the printer unit 155 to perform printing that is based on print data.

The storage unit 12 includes a nonvolatile storage device such as a ROM and a hard disk drive (HDD), and a volatile storage device such as a random access memory (RAM). The storage unit 12 stores control programs and data.

The fixed operation unit 71 includes the display panel 71*a*, a touch panel 71*b*, and a hardware key 71*c*. The display panel 71*a* displays a setting screen and a setting image. The setting image is, for example, a button and a tab. The touch panel 71*b* is attached to the display panel 71*a*. The touch panel 71*b* detects a coordinate of a touch position of the user. The main control unit 10 (the CPU 11) recognizes a setting image operated by the user based on the touch position recognized by the touch panel 71*b*. The fixed operation unit 71 is also provided with the hardware key 71*c*. For example, the hardware key 71*c* includes a start key for issuing an execution instruction of a job, and a mode switch button for switching various modes described below (e.g., standby mode, power saving mode, light sleep mode, and deep sleep mode). These buttons may be displayed on the display panel 71*a* as software keys. The main control unit 10 (the CPU 11) recognizes the operated hardware key 71*c*.

The image forming apparatus 1 includes the document conveyance device 44*a* and the document reading device 14. The document conveyance device 44*a* conveys a set document toward a reading position. The document reading device 14 reads a document conveyed by the document conveyance device 44*a* or a document set on a platen, and generates image data. The main control unit 10 (the CPU 11) controls operations of the document conveyance device 44*a* and the document reading device 14.

The image forming apparatus 1 includes the printer unit 155. The printer unit 155 includes a sheet feeding unit 75 (75*a*, 75*b*), the sheet conveyance unit 97, the image forming unit 15, and the fixing unit 70. The engine control unit 96 includes an engine control circuit (engine CPU) and an engine memory. The main control unit 10 and the engine control unit 96 communicate with each other. The main control unit 10 (the CPU 11) conveys a printing instruction, the content of a print job, and image data to be used in printing, to the engine control unit 96. The engine control unit 96 receives an instruction of the main control unit 10, and controls sheet feeding, sheet conveyance, and formation, transfer, and fixing of a toner image. In other words, the engine control unit 96 controls operations of the sheet feeding unit 75 (75*a* and 75*b*), the sheet conveyance unit 97, the image forming unit 15, and the fixing unit 70.

The engine control unit 96 controls the sheet feeding unit 75 (75*a*, 75*b*) to feed sheets one by one. The engine control unit 96 causes the sheet conveyance unit 97 to convey the supplied sheet to the discharge tray 16*a* or 16*b* included in the postprocessing device 16, through the image forming unit 15 and the fixing unit 70. The engine control unit 96 causes the image forming unit 15 to form a toner image to be transferred onto the conveyed sheet. The engine control unit 96 causes the toner image to be transferred onto the sheet. The engine control unit 96 controls the fixing unit 70 to fix the toner image transferred on the sheet. The sheet conveyance unit 97 discharges the sheet having the fixed toner image, to the discharge tray 16*a* or 16*b*.

The image forming apparatus 1 includes a power device 17 for supplying power to various components. By turning ON the power switch 79, the image forming apparatus 1 enters an activated state. Commercial power is supplied to the power device 17 via an outlet, and a source voltage is supplied from the power device 17 to various components. The power device 17 includes a first power block 17*a*. The first power block 17*a* is provided in the power device 17 (power supply board). The first power block 17*a* is a portion collectively including a circuit and an element that supply power to components to be constantly supplied with power. A portion of the power device 17 that is other than the portion (the first power block 17*a*) to be constantly supplied with power corresponds to a second power block 17*b*.

The power device 17 supplies power in any mode of the standby mode, the power saving mode, the light sleep mode, and the deep sleep mode. Based on a request of the main control unit 10 (the CPU 11 or the network connection unit 84), the power device 17 switches a supply mode. In this manner, the image forming apparatus 1 according to the present example embodiment can shift to various modes.

The standby mode is a mode for supplying power in such a manner as to enable printing to be performed in the printer unit 155. The standby mode will also be referred to as an active mode, a normal mode, or a Standby Mode. In the standby mode, power supplied by the power device 17 is larger than that in the power saving mode and the light sleep mode. In other words, the standby mode is a mode having the largest power consumption among the four modes. For example, the fixing unit 70 is in a sufficiently-heated state in the standby mode. Thus, a print operation can be executed promptly, in a case where the main control unit 10 receives a print job.

In the power saving mode, supplied power is smaller than that in the standby mode. The power saving mode is a first power saving mode (Power Saving Mode).

The light sleep mode is a mode in which power consumption is made smaller than that in the power saving mode. The light sleep mode will be sometimes referred to as a Light Sleep Mode.

The deep sleep mode is a mode in which power consumption is made smaller than that in the light sleep mode. The deep sleep mode will be sometimes referred to as a Deep Sleep Mode.

The power device 17 supplies power to the network connection unit 84 irrespective of a supply mode. The network connection unit 84 operates irrespective of a supply mode.

The network connection unit 84 receives print data from a computer. The power device 17 supplies power to the network connection unit 84 irrespective of a supply mode. The network connection unit 84 detects that a print request (transmission of print data) has been received from the computer, irrespective of a supply mode. In this manner, the image forming apparatus 1 is provided with a portion to be constantly supplied with power.

The power device 17 may supply power (may apply a voltage) to the touch panel 71*b* and the hardware key 71*c* irrespective of a supply mode. In this case, the first power block 17*a* supplies power to the touch panel 71*b* and the hardware key 71c. The touch panel 71b and the hardware key 71c can detect a user operation irrespective of a supply mode.

FIG. 20 illustrates a table listing types of components to be supplied with power by the power device 17, by various modes. Hereinafter, various modes will be described in detail with reference to the table.

<Standby Mode>

In the standby mode, a power control device (power control unit) 700 supplies power to the main control unit 10 (the CPU 11, the network connection unit 84, and the wireless communication unit 81), the storage unit 12, a sub control unit (controller) 300, the document conveyance device 44a, the document reading device 14, the postprocessing device 16, the engine control unit 96, the printer unit 155, the display panel 71a, the touch panel 71b, and the hardware key 71c. In the standby mode, for example, the power device 17 (the first power block 17a and second power block 17b) supplies power to all portions of the image forming apparatus 1. In accordance with the start of power supply, each unit is activated and enters a usable state (i.e., a state in which image formation processing is executable).

Because power is supplied to the power control device 700 in accordance with the power switch 79 being turned ON, the power control device 700 is supplied with power and in a driven state in all modes of the standby mode, the power saving mode, the light sleep mode, and the deep sleep mode.

The sub control unit 300 includes a CPU 301. The CPU 301 transmits an instruction from the engine control unit 96 to the document conveyance device 44a, the document reading device 14, and the postprocessing device 16. The document conveyance device 44a, the document reading device 14, and the postprocessing device 16 operate based on the instruction of the CPU 301.

<Power Saving Mode>

In the power saving mode, the power control device 700 supplies power to the main control unit 10 (the CPU 11, the network connection unit 84, and the wireless communication unit 81), the storage unit 12, the engine control unit 96, the touch panel 71b, and the hardware key 71c. When a screen-off time elapses from the start of the power saving mode without an operation being performed on the wireless operation unit 50 and the fixed operation unit 71 (the touch panel 71b, the hardware key 71c), the power device 17 may stop power supply to the display panel 71a. Power supply to the display panel 71a is minimized. For example, for making the power saving mode recognizable, the power control device 700 may supply power only to an LED provided on the display panel 71a.

On the other hand, in the power saving mode, the power control device 700 stops power supply to the sub control unit 300, the document conveyance device 44a, the document reading device 14, the postproces sing device 16, and the printer unit 155. The power saving mode has a smaller power consumption of the image forming apparatus 1 than that in the standby mode. In contrast, the main control unit 10 and the engine control unit 96 operate. Thus, the power saving mode is a mode in which the image forming apparatus 1 can immediately shift to the standby mode (printing executable state).

<Light Sleep Mode>

In the light sleep mode, the power control device 700 supplies power to the main control unit 10 (the CPU 11, the network connection unit 84, and the wireless communication unit 81), the touch panel 71b, and the hardware key 71c. The image forming apparatus 1 according to the present example embodiment is characterized in the light sleep mode. The deep sleep mode described below is a mode for saving power consumption of the image forming apparatus 1, and is a mode in which power consumption is the smallest among various modes regarding power saving that are included in the image forming apparatus 1. Thus, in the deep sleep mode, power supply to the wireless communication unit 81 is suppressed. In the deep sleep mode, an instruction cannot be issued from the wireless operation unit 50 to the image forming apparatus 1 via wireless communication, accordingly.

In view of the foregoing, the light sleep mode is provided in the present example embodiment. In the light sleep mode, power is continuously supplied to the wireless communication unit 81 while saving power consumption of the image forming apparatus 1. A wireless communication state of the wireless operation unit 50 and the image forming apparatus 1 can be thereby kept in an established state while saving power consumption of the image forming apparatus 1. Thus, a sleep recovery instruction can be issued from a distant location to the image forming apparatus 1 in a power-saved state.

<Deep Sleep Mode>

In the deep sleep mode, the power control device 700 supplies power to the network connection unit 84, the touch panel 71b, and the hardware key 71c. Among power blocks in the power device 17, only the first power block 17a operates.

In contrast in the deep sleep mode, the power control device 700 stops power supply to the main control unit 10 (the CPU 11, the wireless communication unit 81), the storage unit 12, the sub control unit 300, the document conveyance device 44a, the document reading device 14, the postproces sing device 16, the engine control unit 96, the printer unit 155, and the display panel 71a. The deep sleep mode is a mode for saving the power consumption of the image forming apparatus 1 as far as possible. Thus, in the deep sleep mode, the power consumption of the image forming apparatus 1 is the smallest as compared with those in other supply modes. The power consumption of the image forming apparatus 1 in the deep sleep mode is, for example, less than 1 watt.

For making power consumption as small as possible, power supply to the wireless communication unit 81 is stopped in the deep sleep mode. In other words, communication between the wireless operation unit 50 and the wireless communication unit 81 is disconnected in the deep sleep mode. Typically, power of about 0.3 w is required for keeping the wireless communication unit 81 in an operating state. In the deep sleep mode in which power consumption is desired to be reduced as far as possible, power consumption is desired to be reduced even by 0.3 w.

Nevertheless, since communication between the wireless operation unit 50 and the wireless communication unit 81 is disconnected in this mode, an instruction cannot be issued from the wireless operation unit 50 to the image forming apparatus 1.

In the deep sleep mode, power supply from the power device 17 to the engine control unit 96 is also stopped, and thus it takes time to shift the image forming apparatus 1 to the power saving mode. Suppose a state where, for example, the user is walking toward an installation location of the image forming apparatus 1, and the user might consider to preliminarily issue an instruction for shifting the image forming apparatus 1 to the standby mode or the power saving mode, to the image forming apparatus 1 until the user reaches the image forming apparatus 1. Nevertheless, in this state, the above-described instruction cannot be issued from the wireless operation unit 50 because the image forming apparatus 1 is in the deep sleep mode, if connection between the wireless operation unit 50 and the wireless communication unit 81 is disconnected.

For this reason, the light sleep mode is provided in the image forming apparatus 1 according to the present example embodiment as described above.

Shift from the power saving mode to the standby mode, shift from the light sleep mode to the power saving mode or the standby mode, and shift from the standby mode to the power saving mode, the light sleep mode, or the deep sleep mode are performed based on an operation performed by the user (operator, serviceman) such as an operation of a sleep key provided on the wireless operation unit 50. The sleep key is a software key displayed on the display 51 of the wireless operation unit 50, for example. At this time, when the sleep key of the wireless operation unit 50 is operated, a sleep signal is output from the wireless operation unit 50 to the power device 17. The main control unit 10 thereby controls the power control device 700 to shift the image forming apparatus 1 to the power saving mode or the light sleep mode. The image forming apparatus 1 may shift to the power saving mode from the standby mode in a case where the image forming apparatus 1 has not been operated for a predetermined time or more, that is to say, in a case where a period in which an image formation instruction is not issued to the image forming apparatus 1 exceeds the predetermined time. Similarly, the image forming apparatus 1 may shift to the light sleep mode from the power saving mode in a case where the image forming apparatus 1 in the power saving mode has not been operated for a predetermined time or more, that is to say, in a case where a period in which an image formation instruction is not issued to the image forming apparatus 1 when the image forming apparatus 1 is in the power saving mode exceeds the predetermined time. Similarly, the image forming apparatus 1 may shift to the deep sleep mode from the light sleep mode in a case where the image forming apparatus 1 in the light sleep mode has not been operated for a predetermined time or more, that is to say, in a case where a period in which an image formation instruction is not issued to the image forming apparatus 1 when the image forming apparatus 1 is in the light sleep mode exceeds the predetermined time. The predetermined time may be preset to 60 seconds, for example, or may be set to an arbitrary time by the user.

The image forming apparatus 1 according to the present example embodiment causes the power device 17 to supply power to various components in accordance with the image forming apparatus 1 shifting from a certain mode to another mode. For example, power is not supplied from the power device 17 to the wireless communication unit 81 in the deep sleep mode, but the power device 17 supplies power to the wireless communication unit 81 in accordance with the image forming apparatus 1 shifting from the deep sleep mode to the light sleep mode.

In contrast, the stop of power supply from the power device 17 to various components is also executed in accordance with the image forming apparatus 1 shifting from a certain mode to another mode. For example, power is supplied from the power device 17 to the wireless communication unit 81 in the light sleep mode, but the power device 17 stops power supply to the wireless communication unit 81 in accordance with the image forming apparatus 1 shifting from the light sleep mode to the deep sleep mode.

As another conceivable configuration, the user can arbitrarily set ON/OFF of the function of wireless communication by operating the fixed operation unit 71. Nevertheless, the function is different from determination as to whether to supply power from the power device 17 to the wireless communication unit 81, in accordance with the switching of a mode. In accordance with shifting from a certain mode to another mode, the image forming apparatus 1 according to the present example embodiment automatically switches whether to supply power from the power device 17 to various components. In other words, power supply from the power device 17 to the wireless communication unit 81 is stopped in accordance with the image forming apparatus 1 shifting from the light sleep mode to the deep sleep mode, without the user's trouble of making a specific setting.

The image forming apparatus 1 may shift from the standby mode directly to the light sleep mode or the deep sleep mode not via the power saving mode. The user can freely set these conditions.

As described above, shift from a certain mode to another mode is executed in a case where a period in which an image formation instruction is not issued to the image forming apparatus 1 exceeds a predetermined time. The period is measured by a timer (counter) 202 controlled by the main control unit 10. The timer 202 measures a time in which an image formation instruction to the image forming apparatus 1 is not issued by the user. As the measurement, an actual time may be measured, or original counting may be performed based on the actual time. A count value to be counted may be counted up like 1 second, 2 seconds, 3 seconds, and so on, for example, or may be counted down like 60 seconds, 59 seconds, 58 seconds, and so on. In the present example embodiment, an image formation instruction to the image forming apparatus 1 refers to the transmission of a print job to the image forming apparatus 1, for example. A stop timing of an image formation instruction refers to a timing at which image formation processing performed by the image forming unit 15 ends. Specifically, the stop timing refers to a timing at which the rotation of the photosensitive drum 9 stops. Nevertheless, the timing is not limited to a timing at which the rotation of the photosensitive drum 9 stops, and may be a timing at which the rotation of the intermediate transfer belt 6 stops, or a timing at which the sheet having the transferred toner image is discharged to the discharge tray 16a (16b), for example. The image formation processing refers to, for example, processing performed from the time when the rotation of the photosensitive drum 9 starts until the time when the last sheet of a series of print jobs is discharged to the discharge tray 16a (16b).

<System Configuration of Wireless Operation Unit>

A system configuration of the wireless operation unit 50 will now be described.

Figure 5:
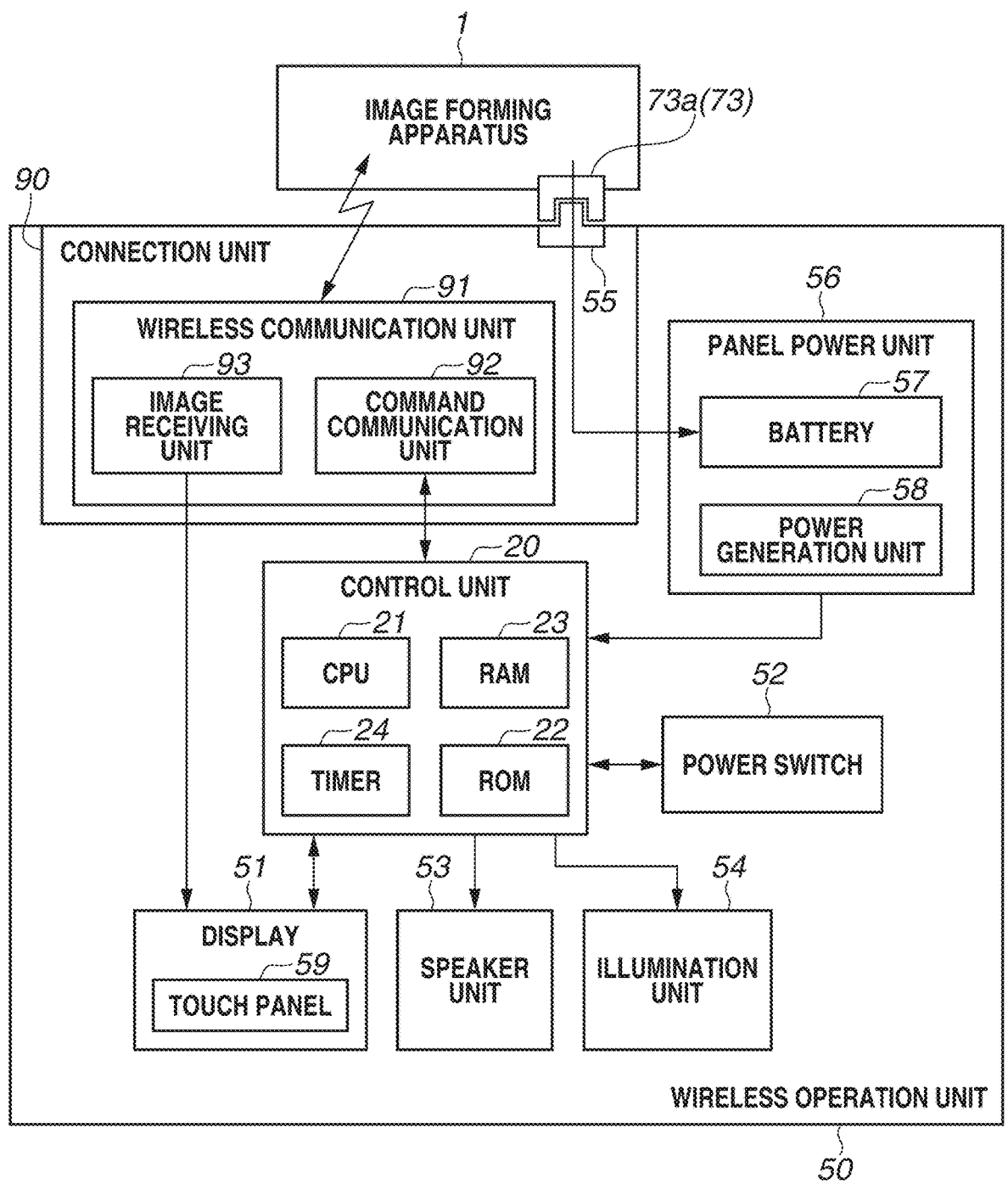
FIG. 5 is a block diagram illustrating a system configuration of a wireless operation unit according to one embodiment.

FIG. 5 is a block diagram illustrating a system configuration of the wireless operation unit 50. As illustrated in FIG. 5, the wireless operation unit 50 includes a control unit 20. The control unit 20 includes a CPU 21, a ROM 22 (storage unit), a RAM 23, and a timer 24. The timer 24 performs time measurement when the control unit 20 performs various types of processing.

The ROM 22 stores data such as various programs regarding control of the wireless operation unit 50. Based on control programs stored in the ROM 22, the CPU 21 performs various types of calculation processing. The RAM 23 temporarily stores data. More specifically, the CPU 21 controls the display 51, the speaker unit 53, and the illumination unit 54 that are connected to the control unit 20, while using the RAM 23 as a work area, based on control programs stored in the ROM 22.

The wireless operation unit 50 further includes a connection unit 90 that connects the wireless operation unit 50 with the image forming apparatus 1. The connection unit 90 includes a charging connector 55 connected to a power supply connector 73a of the image forming apparatus 1, and a wireless communication unit 91 that performs wireless communication with the image forming apparatus 1.

The wireless communication unit 91 includes a command communication unit 92 connected to the CPU 21, and an image receiving unit 93 connected to the display 51. The CPU 21 generates an instruction or a notification for the image forming apparatus 1, and transmits the instruction or the notification to the command communication unit 82 of the image forming apparatus 1 via an antenna (not illustrated) of the command communication unit 92. The CPU 21 receives, via the command communication unit 92, an instruction and information transmitted from the command communication unit 82 of the image forming apparatus 1.

The image receiving unit 93 receives, via an antenna (not illustrated), image data transmitted from the image transmission unit 83 of the image forming apparatus 1, converts the received image data into image data to be displayed on the display 51, and displays the image data on the display 51. In the present example embodiment, the command communication unit 92 and the image receiving unit 93 have been described as separate components, but the command communication unit 92 and the image receiving unit 93 may be combined into one communication line.

The wireless operation unit 50 further includes a panel power unit 56. The panel power unit 56 includes the battery 57 and a power generation unit 58. The battery 57 is a main power source of the wireless operation unit 50, and is a rechargeable battery. When the charging connector 55 is connected to the power supply connector 73a of the image forming apparatus 1, power is supplied from the power device 17 of the image forming apparatus 1 to the battery 57, and the battery 57 is charged. The power generation unit 58 adjusts the power of the battery 57 to a voltage usable in each device included in the wireless operation unit 50. When the power of the power switch 52 is switched from off to on, the battery 57 is charged, and the power adjusted by the power generation unit 58 is supplied to the control unit 20, the display 51, the speaker unit 53, the illumination unit 54, and the connection unit 90.

<Wireless Communication between Image Forming Apparatus and Wireless Operation Unit>

Wireless communication between the image forming apparatus 1 and the wireless operation unit 50 will now be described.

Figure 6:
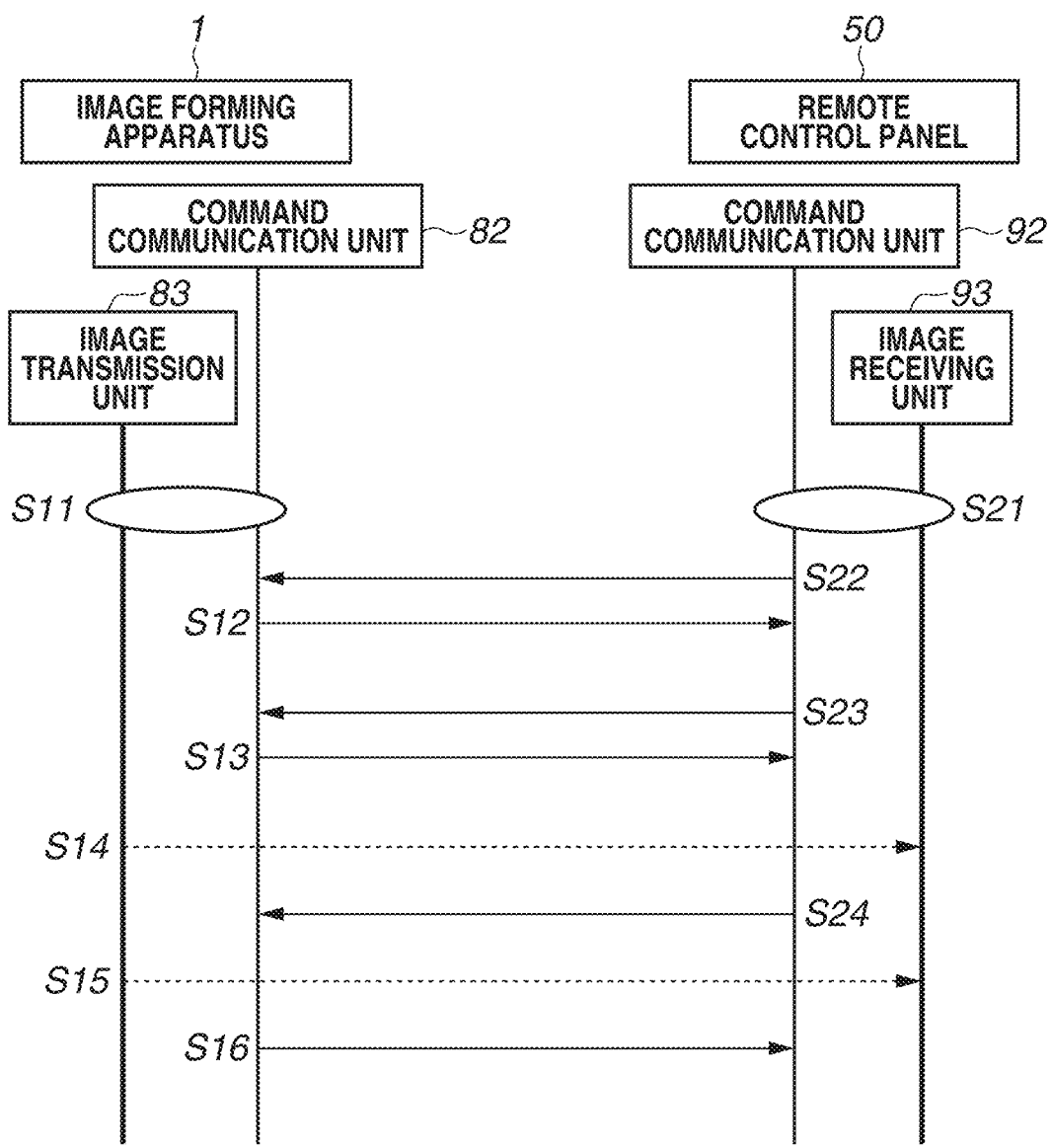
FIG. 6 is a communication transition diagram of an image forming apparatus and a wireless operation unit according to one embodiment.

FIG. 6 is a communication transition diagram of the image forming apparatus 1 and the wireless operation unit 50. When wireless communication is performed between the image forming apparatus 1 and the wireless operation unit 50, the user operates the power switch 79 and activates the image forming apparatus 1 (S11), and operates a power switch 52 and activates the wireless operation unit 50 (S21).

When the wireless operation unit 50 is activated, a negotiation request is transmitted from the command communication unit 92 of the wireless operation unit 50 to the command communication unit 82 of the image forming apparatus 1 (S22). The command communication unit 82 of the image forming apparatus 1 then transmits a response signal to the command communication unit 92 of the wireless operation unit 50 (S12). When the wireless operation unit 50 receives the response signal, a connection sequence ends and wireless communication is established.

Wireless communication conditions, such as a communication speed and an image compression rate, are mutually set between the image forming apparatus 1 and the wireless operation unit 50 via the command communication units 82 and 92 (S13, S23). When the setting ends, a signal of an image stored in the ROM 22 of the image forming apparatus 1 is transmitted from the image transmission unit 83 of the image forming apparatus 1 to the image receiving unit 93 of the wireless operation unit 50, in accordance with an instruction of the CPU 11 of the image forming apparatus 1 (S14).

The image receiving unit 93 of wireless operation unit 50 converts the received signal of the image, and displays the image on the display 51. Thereafter, the CPU 21 of the wireless operation unit 50 transmits operation information of the display 51 to the command communication unit 82 of the image forming apparatus 1 via the command communication unit 92 (S24), in a case where the user operates the display 51.

Figure 7:
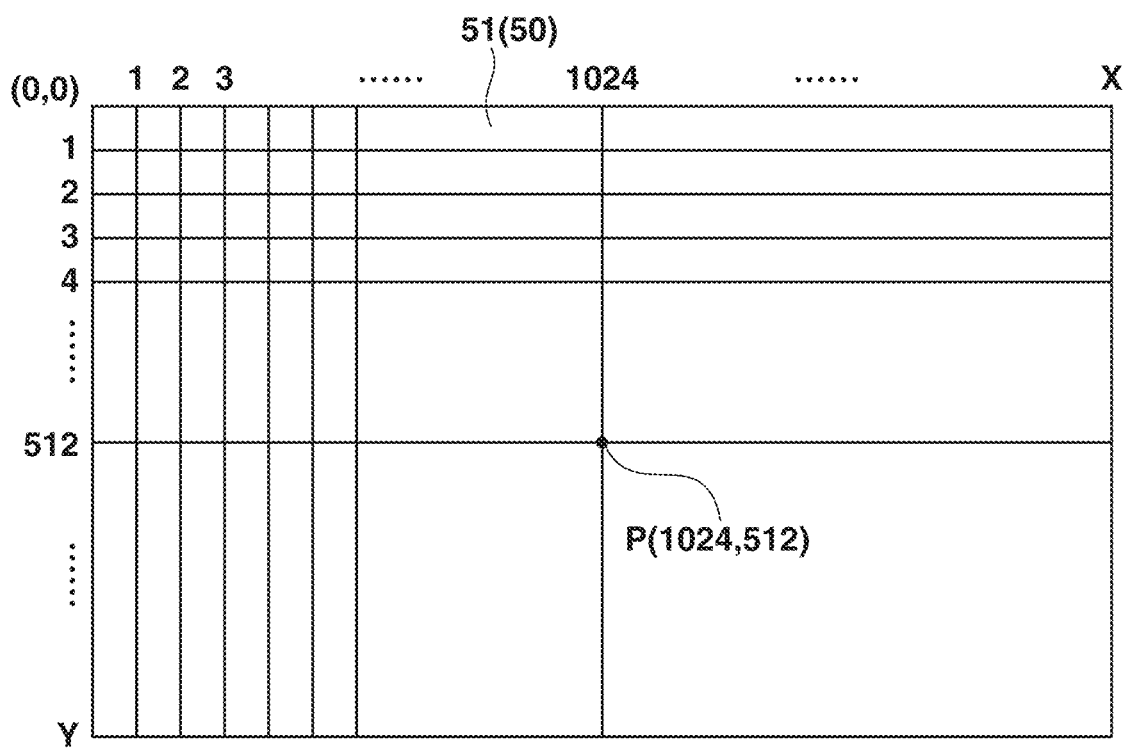
FIG. 7 is a diagram illustrating a coordinate displayed on a display of a wireless operation unit according to one embodiment.

The CPU 21 transmits the operation information of the display 51 to the image forming apparatus 1 as coordinate information. This will now be described. FIG. 7 is a diagram illustrating a coordinate displayed on the display 51 of the wireless operation unit 50. As illustrated in FIG. 7, the display 51 is divided in an X direction and a Y direction. Although the number of divided cells depends on the type of a touch panel, a resistive touch panel in the present example embodiment is divided into 204 in the X direction and 1024 in the Y direction.

A coordinate is represented by (X, Y) in accordance with a distance from an origin (0, 0). For example, a position P illustrated in FIG. 7 is located at a position 1024 in the X direction and 512 in the Y direction from the origin, and thus the position P is represented by (1024, 512) as a coordinate. The coordinate data is transmitted from a touch panel 59 (FIG. 5) of the display 51 to the CPU 21 of the wireless operation unit 50, and is transmitted from the command communication unit 92 to the image forming apparatus 1 in accordance with an instruction of the CPU 21. In the present example embodiment, communication between the image forming apparatus 1 and the wireless operation unit 50 is based on a bit length of 8, and therefore one-eighth of the numerical value of the coordinate data is transmitted. More specifically, in a case where a coordinate is (1024, 512), the coordinate is transmitted after being replaced with (128, 64).

The CPU 11 of the image forming apparatus 1 determines a position on the display 51 of the wireless operation unit 50 that has been touched by the user, based on the input coordinate data. In accordance with the touched position, the CPU 11 transmits image data and issues a lighting control instruction of the illumination unit 54 and a voice on/off instruction of the speaker unit 53, to the wireless operation unit 50 (S15, S16). Also in cases other than a case where the image forming apparatus 1 receives operation information of the display 51 from the wireless operation unit 50, the image forming apparatus 1 issues the above-described instructions to the wireless operation unit 50 in accordance with the state of the image forming apparatus 1 or the state of the wireless operation unit 50.

Figure 8A:
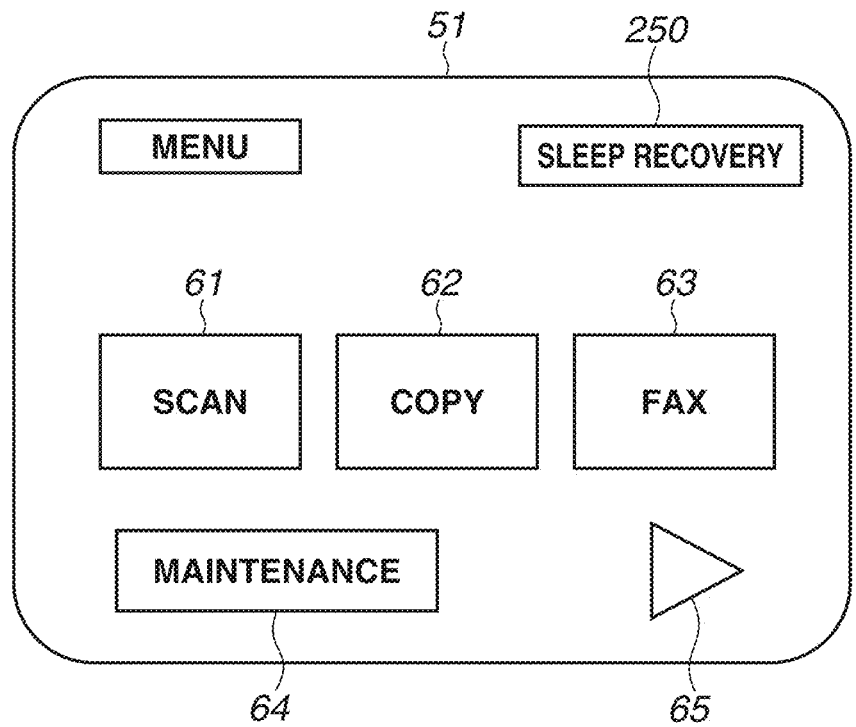
FIGS. 8A and 8B are diagrams each illustrating an example of an image to be displayed on a display of a wireless operation unit according to one embodiment.

The transition of an image when the display 51 of the wireless operation unit 50 is operated will now be described. FIGS. 8A, 8B, 9A and 9B are diagrams each illustrating an example of an image to be displayed on the display 51 of the wireless operation unit 50. A main menu screen illustrated in FIG. 8A is initially displayed by default on the display 51 of the wireless operation unit 50. More specifically, an image illustrated in FIG. 8A is transmitted from the image transmission unit 83 to the image receiving unit 93 in the process of Step S14. A scan button 61 for making a setting of the document reading device 14, a copy button 62 for making a setting of the image forming unit 15, a FAX button 63 for making a setting of a FAX, a maintenance button 64, and an arrow button 65 for switching the screen to the next page are displayed on the main menu screen.

Figure 8B:
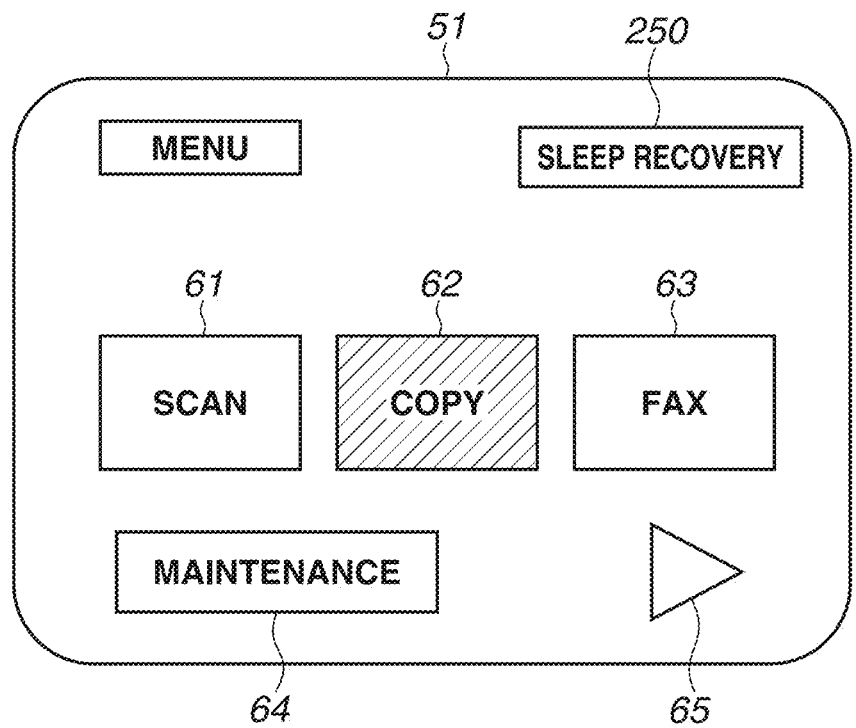

In a case where the CPU 11 of the image forming apparatus 1 determines that the user has selected the copy button 62, based on coordinate data transmitted from the wireless operation unit 50, the CPU 11 transmits an image in which the copy button 62 is displayed in gray as illustrated in FIG. 8B, to the image receiving unit 93 via the image transmission unit 83. The image illustrated in FIG. 8B is thereby displayed on the display 51 of the wireless operation unit 50.

Figure 9A:
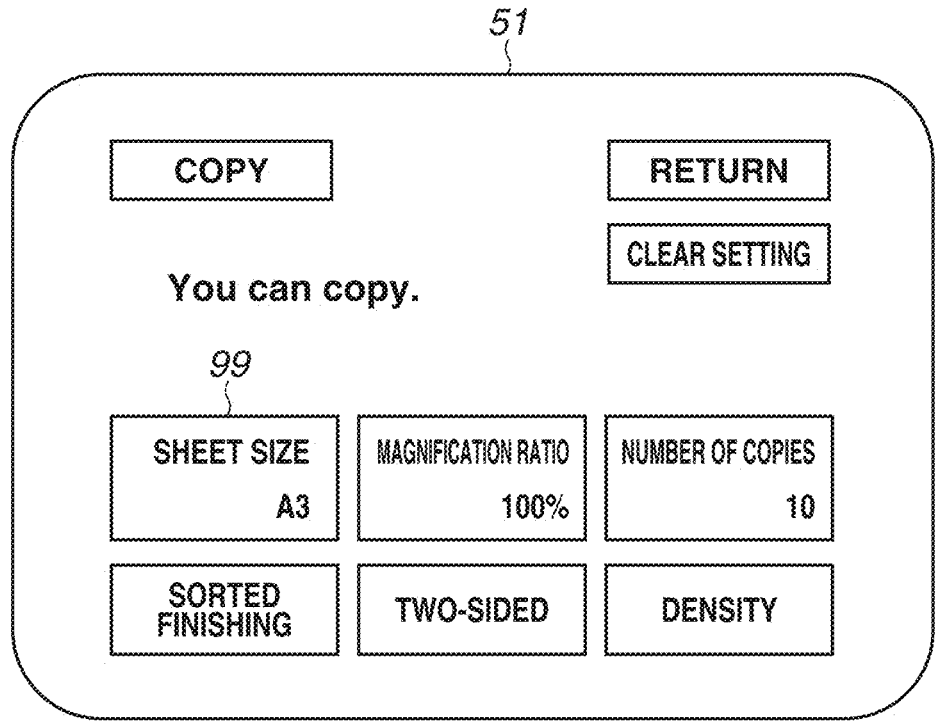
FIGS. 9A and 9B are diagrams each illustrating an example of an image to be displayed on a display of a wireless operation unit according to one embodiment.

After a certain period of time has elapsed since the image illustrated in FIG. 8B is displayed on the display 51, the CPU 11 of the image forming apparatus 1 transmits an image of a copy screen illustrated in FIG. 9A, to the image receiving unit 93 via the image transmission unit 83. The image displayed on the display 51 of the wireless operation unit 50 is thereby switched to the image illustrated in FIG. 9A. The copy screen illustrated in FIG. 9A is an example of a screen on which information regarding image formation (image formation information) is displayed, and also a screen for setting an image forming condition. The user can set various image forming conditions on this screen. The image forming conditions include a condition of a sheet size, a condition of a magnification ratio, and a condition of density. Aside from these, the image forming conditions also include a setting as to whether to perform stapling being processing that uses the postprocessing device 16, and a setting of a position at which stapling is to be performed. The user can set such image forming conditions via the wireless operation unit 50. In this manner, the wireless operation unit 50 can display information regarding image formation.

Figure 9B:
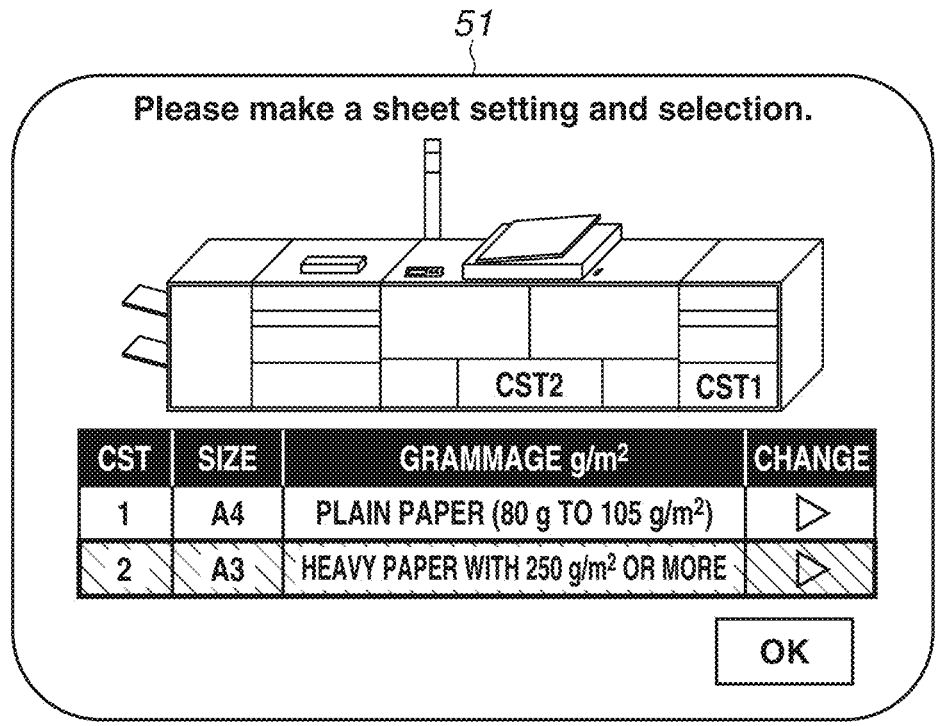

The CPU 11 (an example of a resetter) of the image forming apparatus 1 transmits an image of a sheet setting screen illustrated in FIG. 9B, to the image receiving unit 93 via the image transmission unit 83, in a case where the CPU 11 determines that the user has selected a sheet size button 99, based on the coordinate data transmitted from the wireless operation unit 50. The image displayed on the display 51 of the wireless operation unit 50 thereby switches to the image illustrated in FIG. 9B. An external appearance of the image forming apparatus 1, and sizes and grammages of the sheets S stored in the sheet cassettes 75a and 75b are displayed on the sheet setting screen. This screen also serves as an example of a screen displaying information regarding image formation. In this manner, the wireless operation unit 50 can receive, from the image forming apparatus 1, information regarding image formation such as sizes and grammages of the sheets S stored in the sheet cassettes 75a and 75b, and display the information on the display 51. The information regarding image formation also includes a remaining toner amount and information (remaining number of sheets to be printed) regarding a print job being executed, in addition to a sheet size and a grammage. These pieces of information are periodically (for example, every five seconds) transmitted from the wireless communication unit 81 of the image forming apparatus 1 to the wireless communication unit 91 of the wireless operation unit 50.

In the present example embodiment, an image to be displayed on the display 51 of the wireless operation unit 50 is stored in the storage unit 12 of the image forming apparatus 1, the image is transmitted from the image forming apparatus 1 to the wireless operation unit 50, and the image is displayed on the display 51. With such a configuration, the capacity of data stored in the ROM 22 can be reduced as compared with a configuration of storing an image into the ROM 22 of the wireless operation unit 50. It is therefore possible to reduce the capacity of the ROM 22, and reduce a manufacturing cost.

By displaying the external appearance of the image forming apparatus 1 on the display 51 as in the sheet setting screen illustrated in FIG. 9B, the user's false recognition of the position of the sheet cassette 75a or 75b can be prevented, and usability consequently improves. In a case where the external appearance of the image forming apparatus 1 is displayed on the display 51 of the wireless operation unit 50 for achieving this, it is desirable to change image data to be stored into the ROM 22, for each model of the image forming apparatus 1 in the configuration of storing an image into the ROM 22 of the wireless operation unit 50. In contrast to this, there is no need to change image data to be stored into the ROM 22, for each model of the image forming apparatus 1 in the configuration of displaying an image stored in the storage unit 12 of the image forming apparatus 1, on the display 51 of the wireless operation unit 50. It is accordingly possible to share the wireless operation unit 50 among a plurality of models of the image forming apparatus 1, and reduce manufacturing cost of the image forming apparatus 1 and the wireless operation unit 50.

The image forming apparatus 1 according to the present example embodiment has a configuration of storing a part of an image to be displayed on the display 51, in the ROM 22 of the wireless operation unit 50. Specifically, the images illustrated in FIGS. 8A, 8B, and 9A are prestored in the ROM 22 of the wireless operation unit 50 as images regarding the image forming apparatus 1. The CPU 21 controls the display 51, and switches an image to be displayed on the display 51, between an image stored in the ROM 22 and an image received by the image receiving unit 93.

Figure 10:
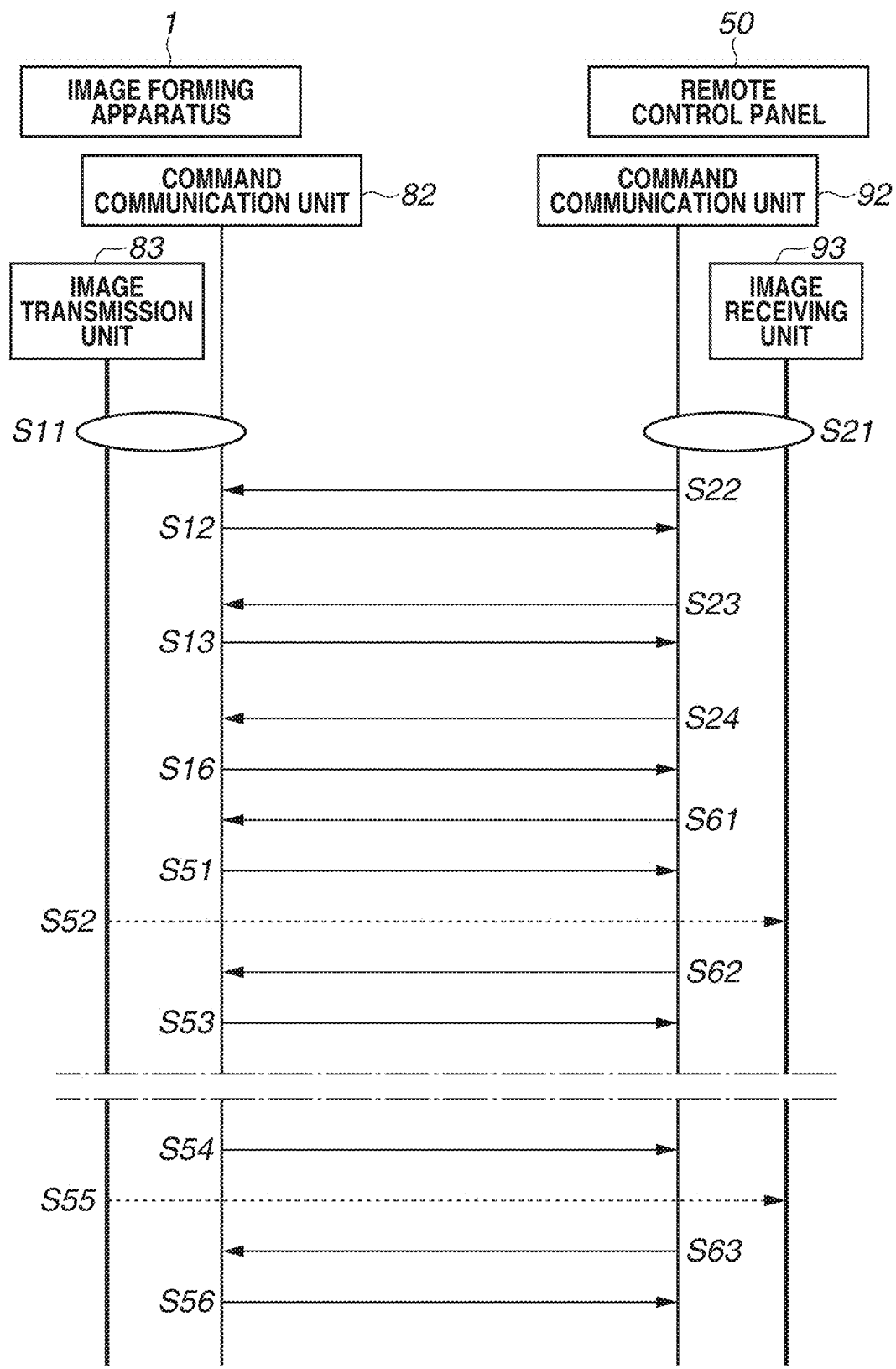
FIG. 10 is a communication transition diagram of an image forming apparatus and a wireless operation unit according to one embodiment.

FIG. 10 is a communication transition diagram of the image forming apparatus 1 and the wireless operation unit 50. In the following description, steps in which processes similar to those in the steps described in the above-described example embodiment with reference to FIG. 6 are to be performed are assigned the same step numbers, and the description will be omitted or simplified. As illustrated in FIG. 10, the user firstly operates the power switch 79 and activates the image forming apparatus 1 (S11), and operates the power switch 52 and activates the wireless operation unit 50 (S21).

A negotiation request and a response signal are then exchanged between the command communication unit 92 of the wireless operation unit 50 and the command communication unit 82 of the image forming apparatus 1 (S12, S22), and wireless communication is thereby established between the image forming apparatus 1 and the wireless operation unit 50. Thereafter, wireless communication conditions, such as a communication speed and an image compression rate, are mutually set via the command communication unit 92 of the wireless operation unit 50 and the command communication unit 82 of the image forming apparatus 1 (S13, S23). After the setting ends, the CPU 21 of the wireless operation unit 50 displays the main menu screen illustrated in FIG. 8A, which is an image stored in the ROM 22, as an image to be displayed on the display 51.

In a case where the user operates the display 51, the CPU 21 of the wireless operation unit 50 transmits the operation information to the command communication unit 82 of the image forming apparatus 1 via the command communication unit 92 (S24). In the present example embodiment, the main menu screen displayed on the display 51 is an image stored in the ROM 22 of the wireless operation unit 50. Thus, the CPU 11 of the image forming apparatus 1 cannot identify what exists at a position indicated by the coordinate data, even if coordinate data is transmitted to the image forming apparatus 1 as described in the first example embodiment. In the present example embodiment, the CPU 21 of the wireless operation unit 50 therefore transmits information corresponding to a button selected by the user, to the image forming apparatus 1 via the command communication unit 92 as operation information.

The CPU 11 of the image forming apparatus 1 then issues a lighting control instruction for the illumination unit 54 and an on/off instruction for voice output from the speaker unit 53 to the wireless operation unit 50 (S16) in accordance with the operation information of the display 51 that has been input from the wireless operation unit 50. Also in cases other than a case where the image forming apparatus 1 receives operation information of the display 51 from the wireless operation unit 50, the image forming apparatus 1 issues the above-described control instruction to the wireless operation unit 50 in accordance with the state of the image forming apparatus 1 or the state of the wireless operation unit 50.

In a case where the user selects the maintenance button 64 on the main menu screen illustrated in FIG. 8A, information corresponding to the maintenance button 64 is transmitted to the image forming apparatus 1, and a response is returned from the image forming apparatus 1 to the wireless operation unit 50 (S51, S61). When the CPU 21 of the wireless operation unit 50 receives the response from the image forming apparatus 1, the CPU 21 switches control to display the image received by the image receiving unit 93, as an image to be displayed on the display 51.

Figure 11:
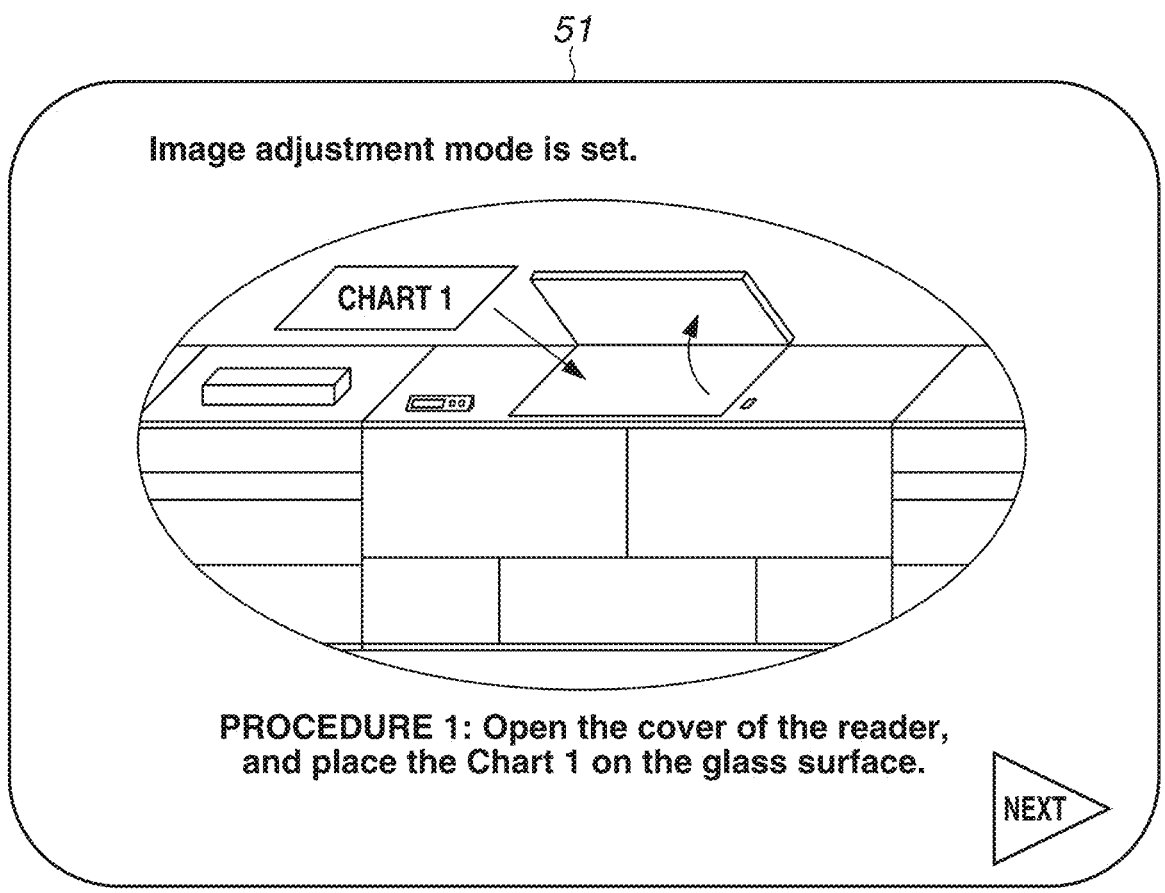
FIG. 11 is a diagram illustrating an example of an image to be displayed on a display of a wireless operation unit according to one embodiment.

The CPU 11 of the image forming apparatus 1 then transmits a maintenance movie stored in the storage unit 12 to the image receiving unit 93 of the wireless operation unit 50 via the image transmission unit 83 (S52). FIG. 11 is a diagram illustrating an image adjustment screen being an example of a maintenance movie. As illustrated in FIG. 11, a series of operations of opening the cover of the document reading device 14 and placing a chart sheet on a glass surface are displayed on the image adjustment screen as animation. The user places the chart sheet on the glass surface of the document reading device 14 in accordance with the image adjustment screen, and thereby the user can adjust the hue of an image to be formed by the image forming unit 15.

When the user ends the adjustment of the image, an end notification is transmitted from the CPU 21 of the wireless operation unit 50 to the command communication unit 82 of the image forming apparatus 1 via the command communication unit 92 (S62). Thereafter, an image switch notification is transmitted from the CPU 11 of the image forming apparatus 1 to the command communication unit 92 of the wireless operation unit 50 via the command communication unit 82 (S53). When the CPU 21 of the wireless operation unit 50 receives the image switch notification, the CPU 21 switches control to display the image stored in the ROM 22, as an image to be displayed on the display 51.

In a case where jam of the sheet S occurs when the image forming apparatus 1 is performing image formation, CPU 11 of the image forming apparatus 1 transmits an image switch notification to the wireless operation unit 50 via the command communication unit 82 (S54). When the CPU 21 of the wireless operation unit 50 receives the image switch notification, the CPU 21 switches control to display the image received by the image receiving unit 93, as an image to be displayed on the display 51.

Figure 12:
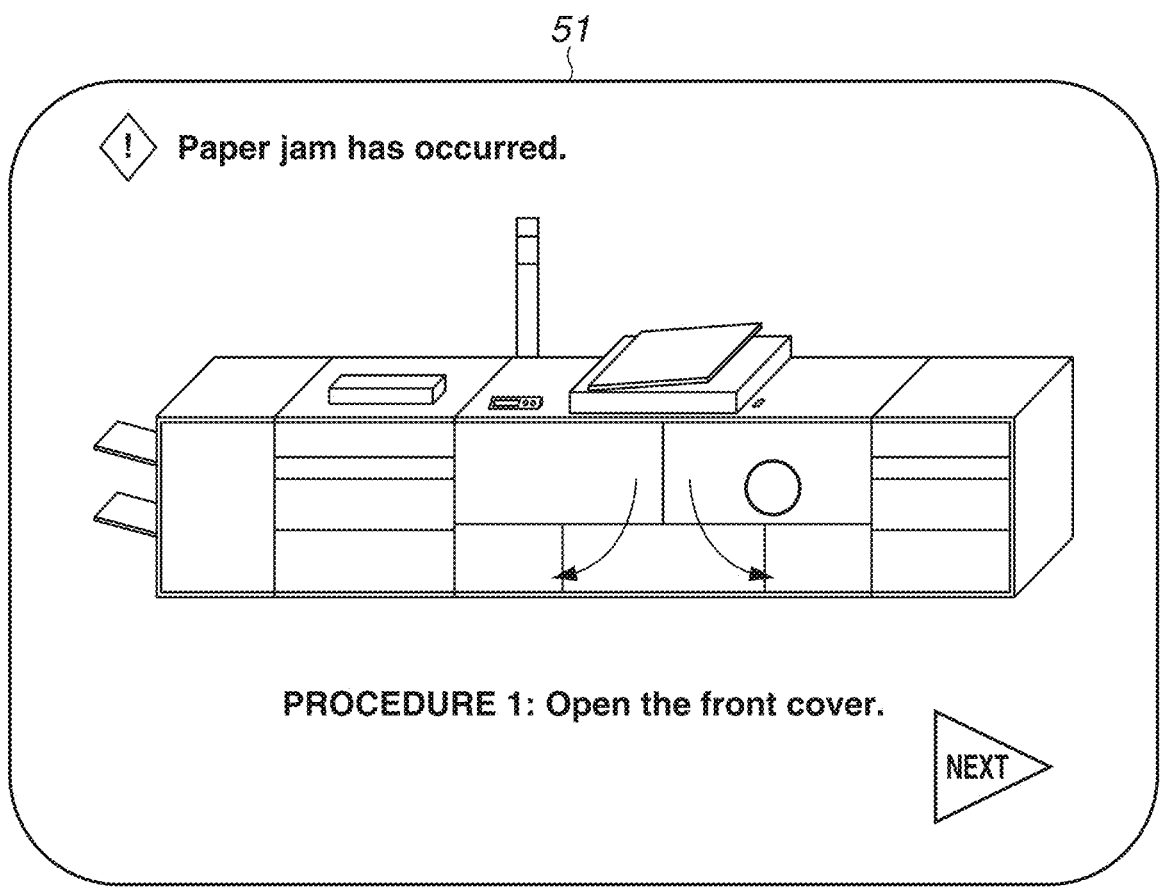
FIG. 12 is a diagram illustrating an example of an image to be displayed on a display of a wireless operation unit according to one embodiment.

The CPU 11 of the image forming apparatus 1 then transmits a movie regarding jam processing that is stored in the storage unit 12 to the image receiving unit 93 of the wireless operation unit 50 via the image transmission unit 83 (S55). FIG. 12 is a diagram illustrating a jam processing screen being an example of a movie regarding jam processing. As illustrated in FIG. 12, the jam processing screen explains with animation a position at which the jam has occurred and a jam processing procedure. The user performs jam processing in accordance with the jam processing screen.

When the user ends jam processing, the CPU 21 of the wireless operation unit 50 transmits an end notification to the command communication unit 82 of the image forming apparatus 1 via the command communication unit 92 (S63). Thereafter, the CPU 11 of the image forming apparatus 1 transmits an image switch notification to the command communication unit 92 of the wireless operation unit 50 via the command communication unit 82 (S56). The CPU 21 of the wireless operation unit 50 thereby switches control to display the image stored in the ROM 22, as an image to be displayed on the display 51.

In this manner, the CPU 21 is configured to switch an image to be displayed on the display 51 of the wireless operation unit 50, between an image stored in the ROM 22 of the wireless operation unit 50 and an image transmitted from the image forming apparatus 1. With this configuration, the capacity of data stored in the ROM 22 can be reduced as compared with a configuration of storing all images to be displayed on the display 51, into the ROM 22 of the wireless operation unit 50. It is therefore possible to reduce the capacity of the ROM 22, and reduce a manufacturing cost.

The description has been given of a configuration of storing still images into the ROM 22 of the wireless operation unit 50, and transmitting a jam processing movie and an image adjustment movie from the image forming apparatus 1 to the wireless operation unit 50. However, the present invention is not limited to this configuration. More specifically, for example, in a configuration in which a process cartridge, a drum cartridge, and a toner cartridge are detachably attached to the image forming apparatus 1, a movie regarding a method of attaching or detaching these cartridges may be transmitted from the image forming apparatus 1 to the wireless operation unit 50.

A movie may also be stored in the ROM 22 of the wireless operation unit 50. Nevertheless, a movie includes a plurality of still images, and thus has a larger capacity than one still image. It is therefore desirable to store a still image in the ROM 22 of the wireless operation unit 50, and control to switch to display an image transmitted from the image forming apparatus 1 on the display 51 when a movie is displayed on the display 51.

<Case of Operating Plurality of Image Forming Apparatuses Using One Wireless Operation Unit>

The configuration of the example embodiment that will be described next is a configuration in which a plurality of image forming apparatuses 1 can be individually operated by switching a connection destination using one wireless operation unit 50. Other possible configurations are configurations similar to those of the image forming apparatus 1 of the example embodiment described above.

Figure 13A:
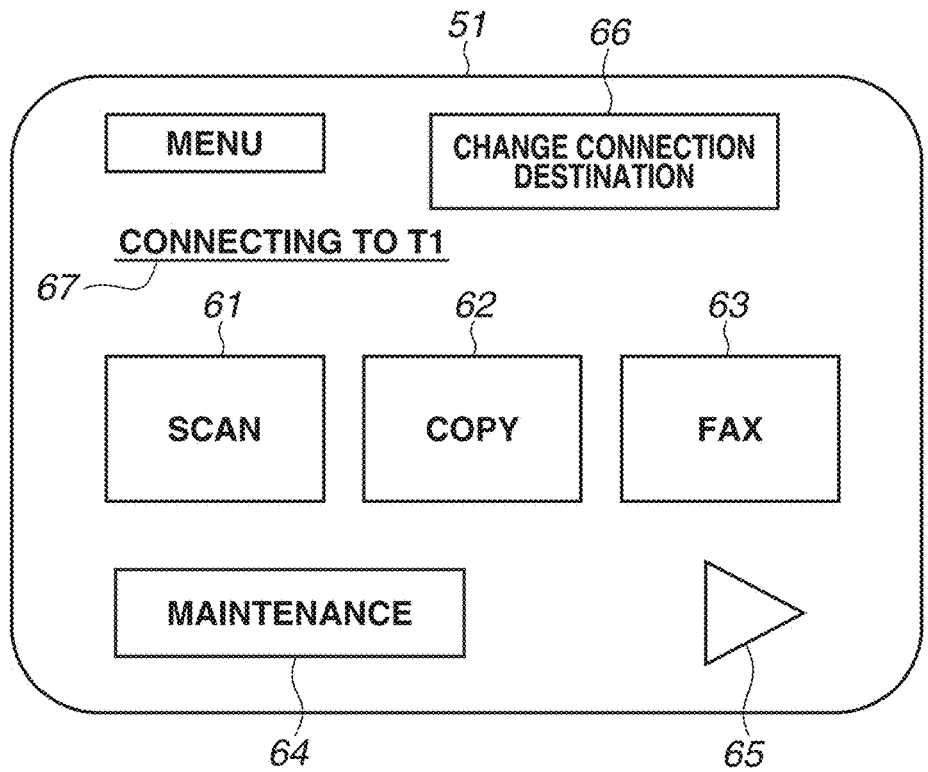
FIGS. 13A and 13B are diagrams each illustrating an example of an image to be displayed on a display of a wireless operation unit according to one embodiment.

FIG. 13A is a diagram illustrating a main menu screen to be displayed on the display 51 of the wireless operation unit 50. As illustrated in FIG. 13A, the main menu screen is provided with a connection destination setting button 66 for setting an image forming apparatus 1 serving as a connection destination of the wireless operation unit 50, and a connection destination display unit 67 displaying a currently-connected image forming apparatus 1. In this example, an image forming apparatus 1 named "T1" is connected as a connection destination of the wireless operation unit 50.

Figure 13B:
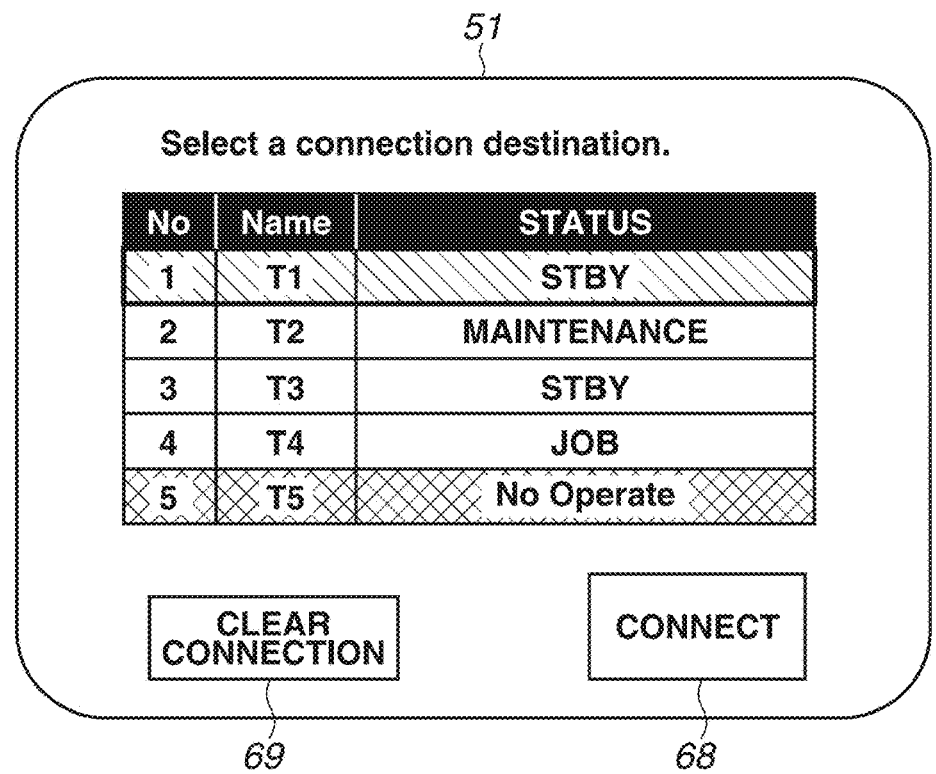

In a case where the user desires to change the image forming apparatus 1 serving as a connection destination of the wireless operation unit 50, the user selects the connection destination setting button 66 on the main menu screen, and displays a connection destination setting screen illustrated in FIG. 13B, on the display 51. As illustrated in FIG. 13B, a list of image forming apparatuses 1 preliminarily recognized by the wireless operation unit 50 is displayed on the connection destination setting screen. In the present example embodiment, five image forming apparatuses 1 having names "T1" to "T5" are recognized by the wireless operation unit 50. The connection destination setting screen also displays the current statuses of the image forming apparatuses 1 displayed as a list. For example, the currently-connected image forming apparatus 1 is displayed with hatching, and the turned-off image forming apparatus 1 is displayed in a grayout state with "No Operate".

Figure 14A:
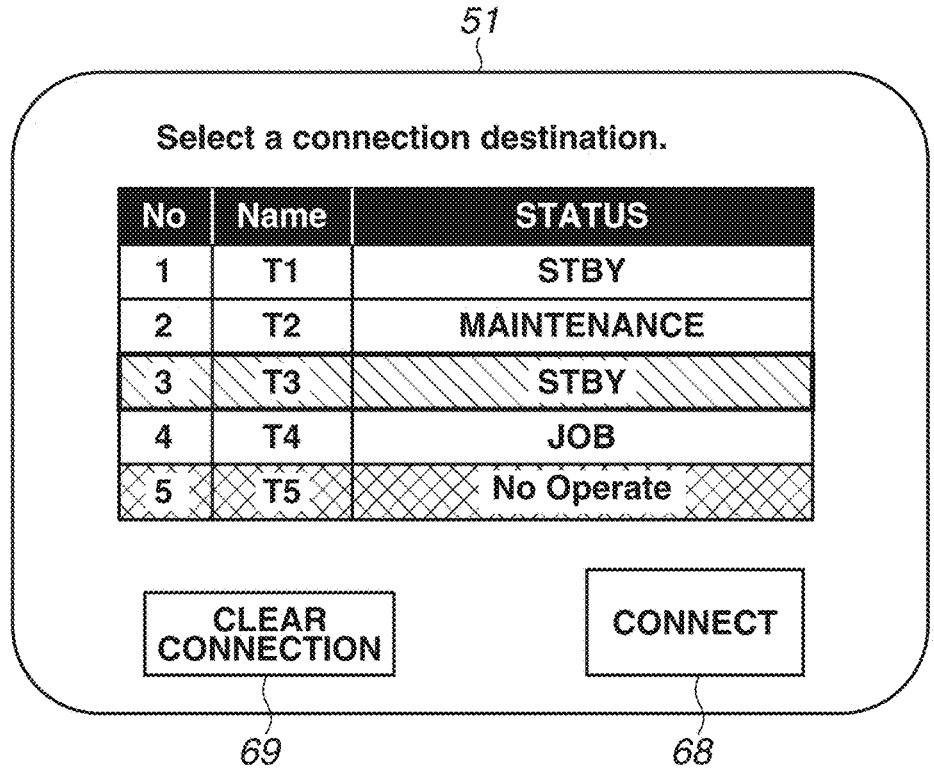
FIGS. 14A and 14B are diagrams each illustrating an example of an image to be displayed on a display of a wireless operation unit according to one embodiment.
Figure 14B:
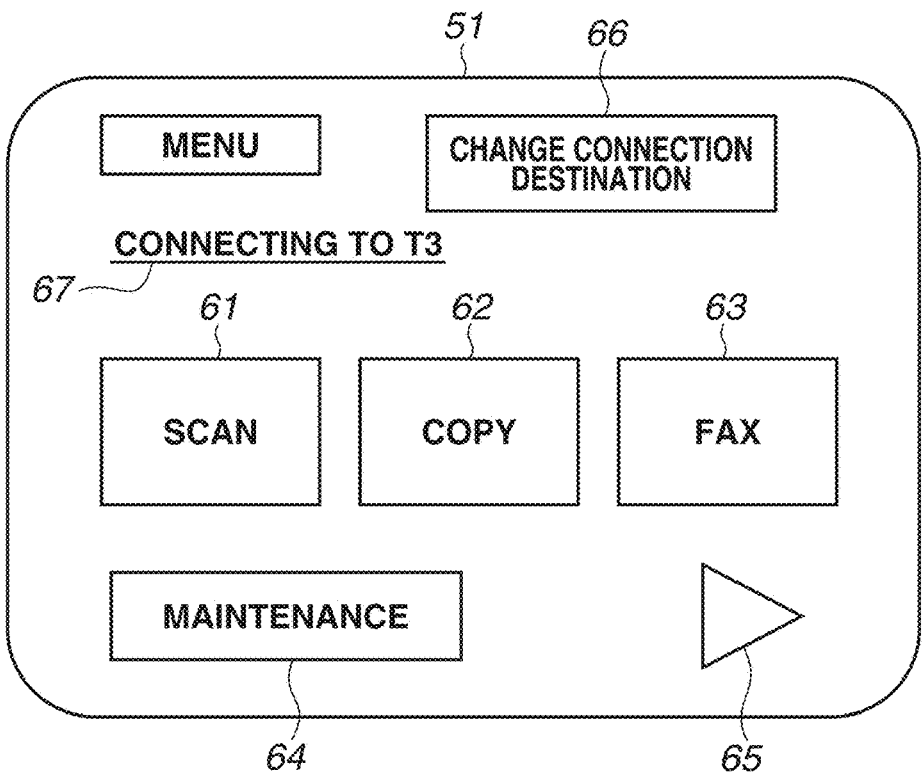

In a case where the user desires to change a connection destination of the wireless operation unit 50, the user touches and selects an image forming apparatus 1 desired to be connected, on the connection destination setting screen. In this example, an image forming apparatus 1 named "T3" is touched. On the connection destination setting screen, the image forming apparatus 1 named "T3" is thereby displayed with hatching, and hatching display of the image forming apparatus 1 named "T1" that has been previously connected is cancelled, as illustrated in FIG. 14A. If the user selects a connection button 68 in this state, the wireless operation unit 50 is connected to the image forming apparatus 1 named "T3", as illustrated in FIG. 14B.

In a case where connection with all image forming apparatuses 1 is to be cancelled, the user selects a connection clear button 69 on the connection destination setting screen illustrated in FIG. 14A. As a result, connection of the wireless operation unit 50 with all image forming apparatuses 1 displayed on the connection destination setting screen is cancelled.

As described above, the user can operate a plurality of image forming apparatuses 1 using one wireless operation unit 50, according to the configuration of the present example embodiment. The user therefore needs not change the wireless operation unit 50 when operating a plurality of image forming apparatuses 1, and the usability can be improved. In a case where the wireless operation unit 50 is arbitrarily purchased as an option device, the user can operate a plurality of image forming apparatuses 1 only by purchasing one wireless operation unit 50. Thus, cost can be reduced when the user installs the wireless operation unit 50.

<Sleep Mode Shift Sequence>

Figure 15:
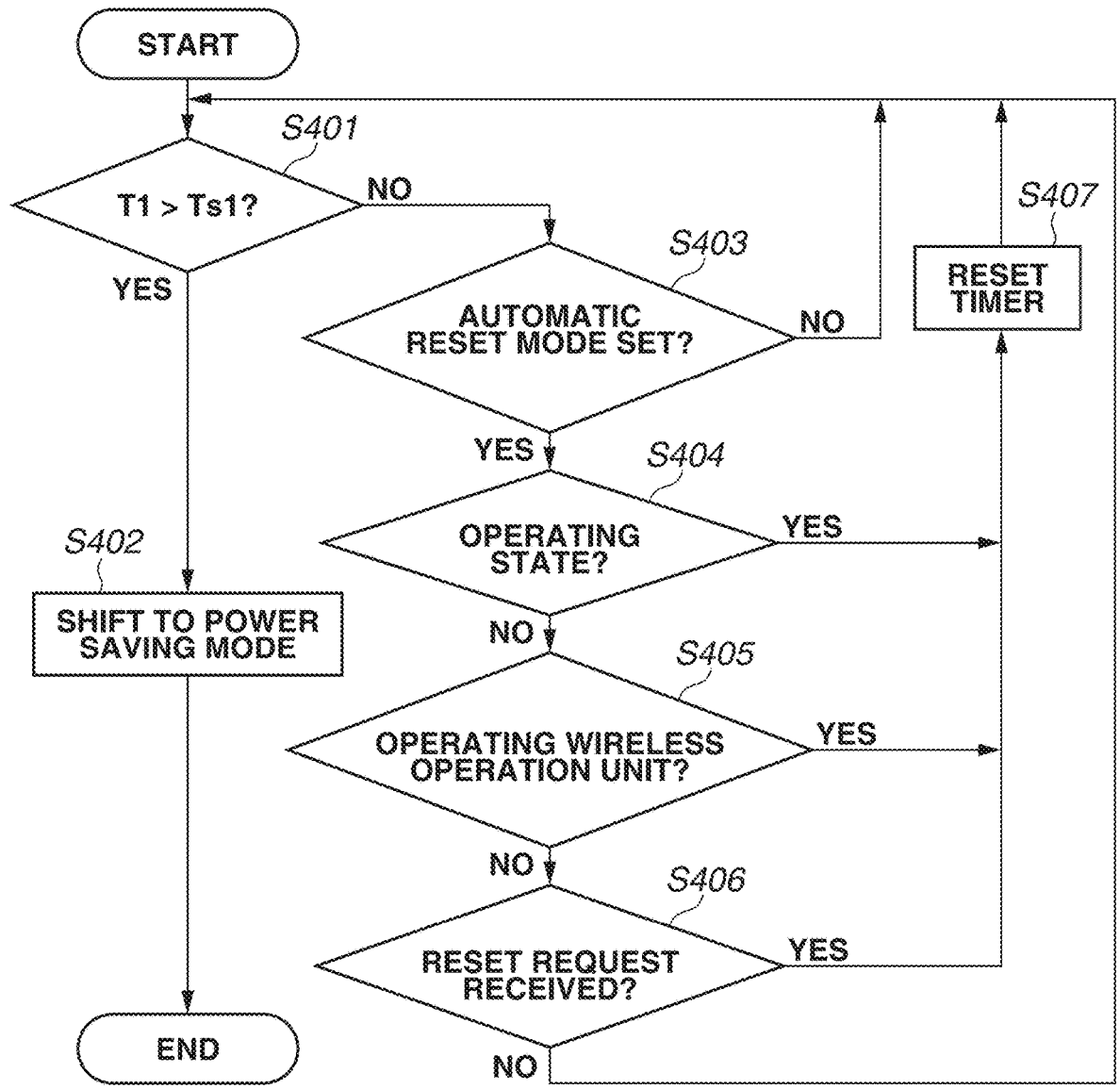
FIG. 15 is a flowchart illustrating an example of a shift sequence to a sleep mode according to one embodiment.

Control for shifting the image forming apparatus 1 and the wireless operation unit 50 to the power saving mode (including the light sleep mode, the deep sleep mode) will now be described. FIG. 15 is a flowchart of a power saving mode shift sequence of the image forming apparatus 1 that is to be executed by the CPU 11. For the sake of simplicity of explanation, a shift from the standby mode to the power saving mode will be described as an example.

As described above, the timer 202 starts counting if a period in which an image formation instruction is not issued to the image forming apparatus 1 starts. The timer 202 is always performing counting, and a count value T1 is a count value for managing shift to the power saving mode, among count values. In a case where the image forming apparatus 1 executes a job (YES in step S404), or in a case where the wireless operation unit 50 is operated by the user (YES in step S405), in step S407, the count value T1 is reset. Also in a case where a reset request command from the wireless operation unit 50 that is to be described below has been received (YES in step S406), in step S407, the count value T1 is reset.

The "reset" in the present example embodiment refers to returning a count value of the timer 202 to a value set at a time point at which the timer 202 starts counting. For example, in a case where the timer 202 counts up a value in order from 0 second like 1 second, 2 seconds, 3 seconds, and so on, a count value of the timer 202 is reset to 0 second when the timer 202 is reset. As another example, in a case where the timer 202 counts down a value in order from 60 seconds like 59 seconds, 58 seconds, 57 seconds, and so on, a count value of the timer 202 is reset to 60 seconds when the timer 202 is reset.

The "reset" in the present example embodiment includes a setting of decreasing a count value of the timer 202 (case of counting up), and a setting of increasing a count value of the timer 202 (case of counting down). Specifically, in a case where the timer 202 counts up a value in order from 0 second like 1 second, 2 seconds, 3 seconds, and so on, the count value is decreased by 30 seconds when the wireless operation unit 50 is operated at the time point at which the count value is 45 seconds. This substantially increases a time until a mode of the image forming apparatus 1 shifts to a sleep mode, by 30 seconds. In a case where the timer 202 counts down a value in order from 60 seconds like 59 seconds, 58 seconds, 57 seconds, and so on, the count value is increased by 30 seconds when the wireless operation unit 50 is operated at the time point at which the count value is 15 seconds. This substantially increases a time until a mode of the image forming apparatus 1 shifts to a sleep mode, by 30 seconds, similarly to the aforementioned example. An amount by which a count value is decreased (increased) is not limited to a predetermined number of seconds, and the user can set any number of seconds.

<Processing of Shifting between Various Modes>

Hereinafter, processing of shifting between various modes will be described in detail with reference to FIG. 15. Shift processing from the standby mode to the power saving mode will be described as an example. The same applies to shift from the power saving mode to the light sleep mode, and shift from the light sleep mode to the deep sleep mode.

In step S401, the CPU 11 refers to a count value T1 of the timer 202, and compares the count value T1 with a preset power saving mode shift time Ts1. A predetermined time is set as the power saving mode shift time Ts1. For example, the power saving mode shift time Ts1 is set like "power saving mode shift time Ts1=60 seconds". In a case where the count value T1 of the timer 202 exceeds the power saving mode shift time Ts1 (YES in step S401), the processing proceeds to step S402. In step S402, the CPU 11 shifts a mode of the image forming apparatus 1 from the standby mode to the power saving mode. In other words, the CPU 11 shifts a mode of the image forming apparatus 1 from the standby mode to the power saving mode in accordance with the count value T1 exceeding the power saving mode shift time Ts1. Depending on the setting, the CPU 11 can also shift a mode of the image forming apparatus 1 from the standby mode directly to the light sleep mode or the deep sleep mode in accordance with the count value T1 exceeding the power saving mode shift time Ts1.

The above-described example is an example of measuring a time in which an image formation instruction to the image forming apparatus 1 is not issued from the user, while the timer 202 counting up a value. However, a method of measuring the time may be a countdown method. In other words, a time in which an image formation instruction for the image forming apparatus 1 is not issued from the user may be measured by counting down a value. For example, a case where the timer 202 counts down a count value like 60 seconds, 59 seconds, 58 seconds, and so on, and the CPU 11 shifts a mode of the image forming apparatus 1 from the standby mode to the power saving mode in accordance with the count value exceeding 0 second is also considered to be a case where "the count value T1 exceeds the power saving mode shift time Ts1" in the present example embodiment. A determination flow of "T1>Ts1?" in step S401 means a flow of determining a timing at which the image forming apparatus 1 enters the power saving mode, by comparing the "time in which an image formation instruction for the image forming apparatus 1 is not issued from the user" and the "predetermined time Ts1". A counting method for the comparison is not limited.

In a case where it is determined in step S401 that the count value T1 does not exceed the power saving mode shift time Ts1 (NO in step S401), the processing proceeds to step S403. In step S403, the CPU 11 determines whether an "automatic reset mode" is set. The image forming apparatus 1 according to the present example embodiment can set whether to turn on or off a function of resetting a count value of the timer 202, in accordance with the wireless operation unit 50 being operated by the user, which will be described in detail below. In other words, if the automatic reset mode is turned off, a count value of the timer 202 is not reset even if the user operates the wireless operation unit 50. Some users place importance on the aspect of energy saving even if productivity declines by a mode of the image forming apparatus 1 frequently shifting to the power saving mode, the light sleep mode, or the deep sleep mode. Some users consider that it is desirable to bring the image forming apparatus 1 into the power saving mode once for saving power consumption, as long as a timing of an image formation instruction is unknown even if the wireless operation unit 50 is operated. For this reason, it is desirable to make executable a setting as to whether to reset a count value of the timer 202 in accordance with the wireless operation unit 50 being operated, depending on the preference of the user. By turning off the automatic reset mode, it is also possible to prevent a count value of the timer 202 from being reset against the user's will by the wireless operation unit 50 being erroneously touched.

If the CPU 11 determines in step S403 that the automatic reset mode is not set (NO in step S403), the processing returns to the determination flow in step S401. During the time, the timer 202 continues to count a value. In contrast, if the CPU 11 determines in step S403 that the automatic reset mode is set (YES in step S403), the processing proceeds to step S404. In step S404, the CPU 11 determines whether the image forming apparatus 1 is in an operating state. For example, the operating state refers to a state in which image formation processing is being executed by the image forming unit 15. The "operating state" further includes a rotating state of the photosensitive drum 9, and a rotating state of the intermediate transfer belt 6. Aside from these, the "operating state" further includes a state in which the document reading device 14 is reading a sheet, and a state in which a sheet is being conveyed.

These operations are started based on an "image formation instruction" issued from the user to the image forming apparatus 1. In the present example embodiment, a state in which the image forming apparatus 1 is in the operating state is considered to be a state in which an "image formation instruction" is issued. In other words, the timer 202 measures a time in which an image formation instruction for the image forming apparatus 1 is not issued from the user, and a measurement start timing is a timing at which the operating state of the image forming apparatus 1 ends. Nevertheless, the timing does not mean mathematically strict moment. For example, the timer 202 may start counting after several seconds from when the operating state of the image forming apparatus 1 ends.

In a case where the CPU 11 determines that the image forming apparatus 1 is in an operating state (YES in step S404), the processing proceeds to step S407. In step S407, the CPU 11 resets a count value of the timer 202. In contrast, in a case where the CPU 11 determines that the image forming apparatus 1 is not in an operating state (NO in step S404), the processing proceeds to step S405. In step S405, the CPU 11 determines whether the wireless operation unit 50 is being operated.

When the wireless operation unit 50 is operated, the command communication unit 92 transmits a signal (hereinafter, referred to as a reset signal) indicating that the wireless operation unit 50 is being operated, to the command communication unit 82 via wireless communication. Examples of the operation include any kind of operation of the user touching the touch panel 59. In other words, every time the user touches the touch panel 59, the command communication unit 92 transmits a reset signal to the command communication unit 82 of the image forming apparatus 1 (YES in step S405). A reset signal may be transmitted every time the user touches the touch panel 59. Alternatively, a reset signal may be transmitted "every several seconds" or "every several operations". For example, every time the timer 24 of the wireless operation unit 50 measures five seconds, the CPU 21 may determine whether the touch panel 59 is touched during the time, and cause the command communication unit 92 to transmit a reset signal if a determination result indicates YES. With this configuration, it is possible to prevent a reset signal from being frequently generated. It is therefore possible to save the power consumption of the wireless operation unit 50, and prolong the life of the battery 57. As another example, every time the touch panel 59 is touched three times, the CPU 21 may cause the command communication unit 92 to transmit a reset signal. Also with this configuration, it is possible to prevent a reset signal from being frequently generated. It is therefore possible to save the power consumption of the wireless operation unit 50, and prolong the life of the battery 57.

In step S407, the CPU 11 of the image forming apparatus 1 resets a count value of the timer 202 upon the command communication unit 82 receiving a reset signal.

If the CPU 11 determines that the wireless operation unit 50 is not being operated (NO in step S405), the processing proceeds to step S406. In step S406, the CPU 11 determines whether the command communication unit 82 has received a reset request.

As illustrated in FIGS. 8A and 8B, on the main menu screen displayed on the display 51 of the wireless operation unit 50, a sleep recovery button (mode switch button) 250 for issuing an execution instruction of "sleep recovery" is displayed. By touching the sleep recovery button 250, the user can reset a count value of the timer 202 of the image forming apparatus 1. Specifically, the CPU 21 issues an instruction to transmit a reset signal to the command communication unit 82 of the image forming apparatus 1 to the command communication unit 92 in accordance with the detection of touch on the sleep recovery button 250.

The sleep recovery button 250 also functions as a button for switching between various modes (e.g., the standby mode, the power saving mode, the light sleep mode, and the deep sleep mode) of the image forming apparatus 1. Specifically, if the user presses the sleep recovery button 250 for a while, a screen for selecting a mode from among various modes is displayed. If the user selects an arbitrary mode from among the displayed modes, a shift signal (shift instruction signal) for issuing a mode shift instruction is transmitted from the wireless communication unit 91 of the wireless operation unit 50 to the wireless communication unit 81 of the image forming apparatus 1. The CPU 11 of the image forming apparatus 1 controls the power control device 700 based on the received shift signal. In this manner, the image forming apparatus 1 shifts to various modes.

If the command communication unit 82 has received a reset request, that is to say, if the command communication unit 82 has received a reset signal (YES in step S406), the processing proceeds to step S407. In step S407, the CPU 11 of the image forming apparatus 1 resets a count value of the timer 202.

If the CPU 11 determines that a reset request has not been received (NO in step S406), the processing returns to the determination flow in step S401. During the time, the timer 202 continues to count a value.

By the image forming apparatus 1 shifting from the standby mode to the power saving mode through the above-described processing flow, the power saving mode shift sequence ends.

Figure 16:
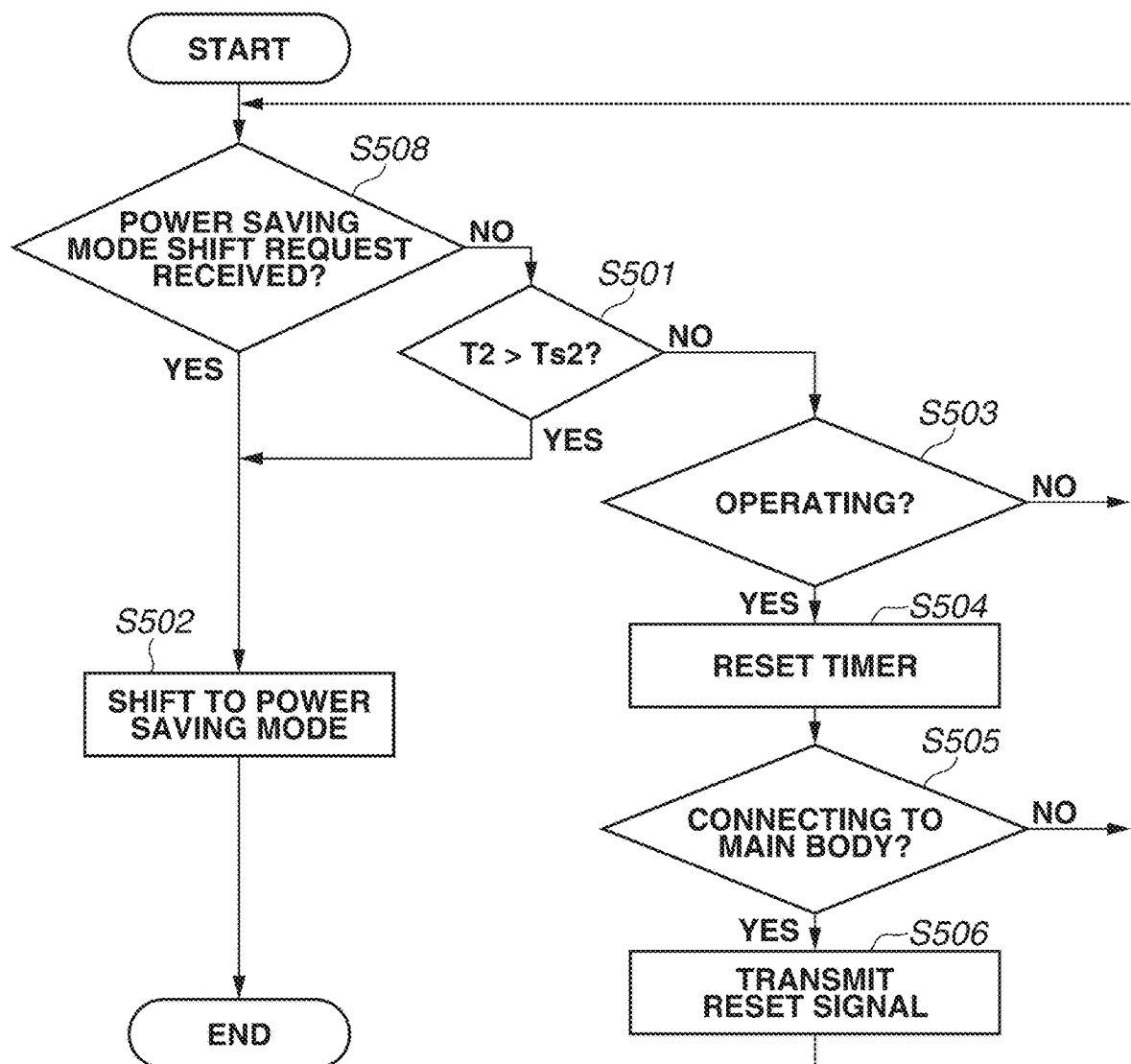
FIG. 16 is a flowchart illustrating an example of a shift sequence to a sleep mode according to one embodiment.

FIG. 16 is a flowchart illustrating a power saving mode shift sequence of the wireless operation unit 50 executed by the CPU 21.

If the image forming apparatus 1 enters a non-operating state, the timer 24 starts counting in response to an instruction from the CPU 21. In step S508, the CPU 21 periodically determines whether a power saving mode shift request has been received from the image forming apparatus 1. The power saving mode shift request is a signal issued by, for example, a power saving mode shift button (not illustrated) provided on a main body of the image forming apparatus 1 being touched. In other words, the wireless operation unit 50 can enter the power saving mode based on the power saving mode shift signal issued from the image forming apparatus 1.

In step S501, the CPU 11 refers to a count value T2 of the timer 24, and compares the count value T2 with a preset power saving mode shift time Ts2. If the count value T2 of the timer 24 exceeds the power saving mode shift time Ts2 (YES in step S501), the processing proceeds to step S502. In step S502, the CPU 21 performs processing of shifting the wireless operation unit 50 to the power saving mode. Even if the power saving mode shift request has been received from the image forming apparatus 1 (YES in step S508), the processing proceeds to step S502. In step S502, the CPU 21 performs power saving mode shift processing.

If the count value T2 is smaller than the power saving mode shift time Ts2 at a timing at which the count value T2 of the timer 24 and the power saving mode shift time Ts2 are compared (NO in step S501), the processing proceeds to step S503. In step S503, the CPU 21 determines whether a touch operation on the touch panel 59 has been detected. If a user operation has not been detected (NO in step S503), the processing returns to the comparison between the count value T2 and the power saving mode shift time Ts2. If a user operation has been detected (YES in step S503), the processing proceeds to step S504. In step S504, the CPU 21 resets the count value T2 of the timer 24.

In step S505, the wireless operation unit 50 determines whether the wireless operation unit 50 is connected with the image forming apparatus 1 via wireless communication. If the wireless operation unit 50 is connected with the image forming apparatus 1 (YES in step S505), the processing proceeds to step S506. In step S506, the CPU 21 issues a request for resetting a count value T1 of the timer 202 of the image forming apparatus 1, and the processing returns to the comparison between the count value T2 and the power saving mode shift time Ts2. If the wireless operation unit 50 is not connected with the image forming apparatus 1 (NO in step S505), the processing returns to step S508. In step S508, the CPU 21 determines whether a power saving mode shift request has been received.

Figure 17A:
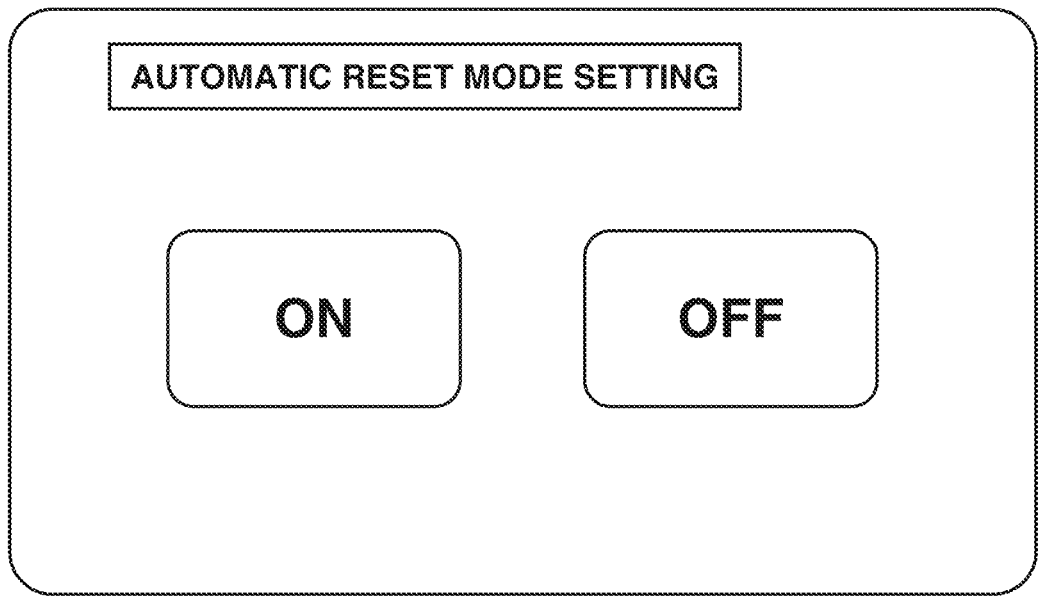
FIGS. 17A and 17B each illustrate an example of a screen regarding an automatic reset mode according to one embodiment.

FIG. 17A illustrates a screen for making a setting of the "automatic reset mode" in the wireless operation unit 50. The user displays the screen by performing a predetermined operation on the main menu screen. On the screen, it can be set whether to turn on or off the function of the "automatic reset mode".

In a case where the "automatic reset mode" is turned on, a reset signal is transmitted from the wireless operation unit 50 to the image forming apparatus 1 based on a user operation performed on the wireless operation unit 50, and a count value of the timer 202 is reset, as described above.

In contrast, in a case where the "automatic reset mode" is turned off, a reset signal is not transmitted from the wireless operation unit 50 to the image forming apparatus 1 even if the user operates the wireless operation unit 50.

In this manner, the user can freely determine whether to use the function of the "automatic reset mode", on the setting screen of the "automatic reset mode".

Figure 17B:
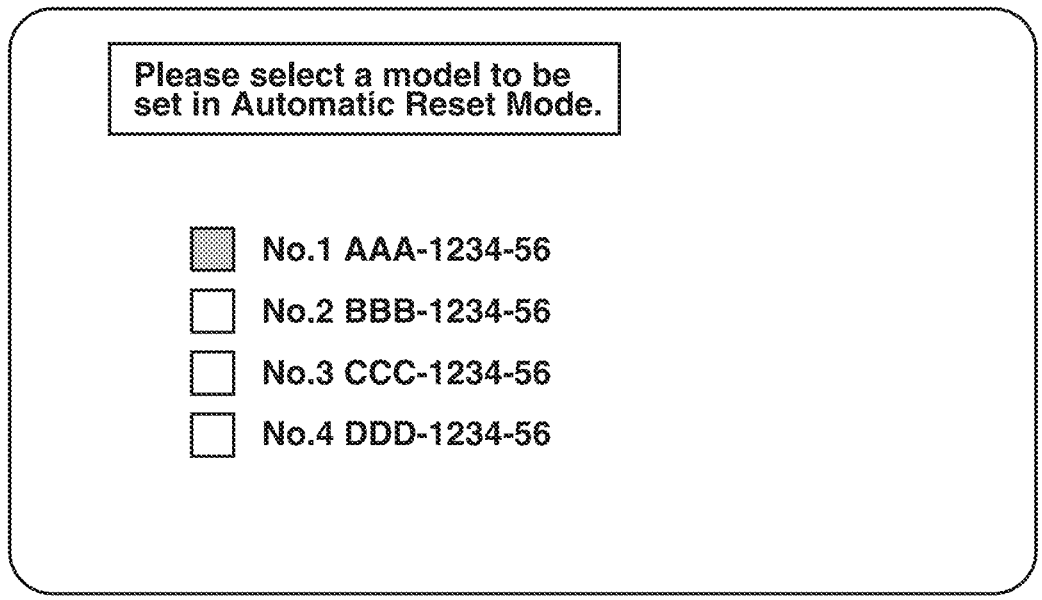

FIG. 17B illustrates a screen for selecting an image forming apparatus 1 to be set in the "automatic reset mode", in the wireless operation unit 50.

As described above, a plurality of different image forming apparatuses can be operated using one wireless operation unit 50. In a case where one wireless operation unit 50 corresponds to four image forming apparatuses, count values of timers of all the four image forming apparatuses are reset by the one wireless operation unit 50 being operated. Since timers of a plurality of image forming apparatuses can be simultaneously reset by one operation, a merit of saving the trouble is caused in a case where the image forming apparatuses are not desired to be brought into the power saving mode. Nevertheless, in a case, for example, where one image forming apparatus is allocated to one operator, this merit sometimes produces a problem instead.

It is assumed that an operator A handles an operation of a certain image forming apparatus A, and an operator B handles an operation of another image forming apparatus B. The operator A and the operator B use a common wireless operation unit 50. In a case where a work of the operator A using the image forming apparatus A ends, the image forming apparatus A is not used for a while. Thus, the image forming apparatus A desirably enters the power saving mode from the viewpoint of energy saving. Nevertheless, even in such a situation, count values of not only a timer of the image forming apparatus B but also a timer of the image forming apparatus A continue to be reset as long as the operator B is operating the wireless operation unit 50 for using the image forming apparatus B. In other words, the image forming apparatus A does not shift to the power saving mode even though the image forming apparatus A is not substantially used.

In view of the foregoing, the wireless operation unit 50 of the present example embodiment can select a model to be set in the automatic reset mode, from among a plurality of image forming apparatuses. On an automatic reset mode selection screen illustrated in FIG. 17B, the user touches the display corresponding to a model to be set in the automatic reset mode. In this example, only an image forming apparatus (AAA-1234-56) is set in the automatic reset mode. Thus, a reset signal is transmitted only to the image forming apparatus (AAA-1234-56) even in a case where the user operates the wireless operation unit 50. A plurality of image forming apparatuses can also be set in the automatic reset mode.

Figure 18A:
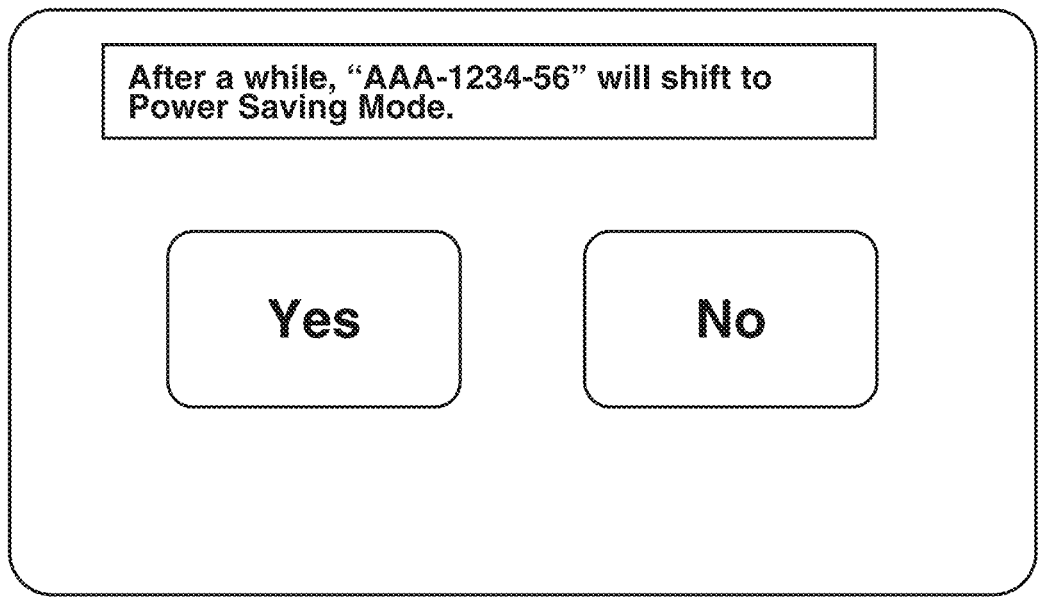
FIGS. 18A and 18B each illustrate an example of a screen regarding an alert mode according to one embodiment.

FIG. 18A illustrates a screen (an example of an announcement screen) displaying that the image forming apparatus 1 will shift to the power saving mode after the lapse of a certain period of time, on the display 51 of the wireless operation unit 50. If a time in which an image formation instruction for the image forming apparatus 1 is not issued reaches the certain period of time, such an alert screen is displayed, and the alert screen announces to the user that a mode shift will be performed after a while, which will be described in detail below. The user can thereby recognize that the image forming apparatus 1 will shift to the power saving mode after a while. The user can therefore take measures by going to the image forming apparatus 1 and pressing a button for resetting a count value of the timer 202.

The timer 202 can also be reset from the wireless operation unit 50. It can be selected whether to transmit a reset signal to the image forming apparatus 1 on the alert screen. Furthermore, a remaining time until the image forming apparatus 1 shifts to the power saving mode can also be displayed on the alert screen. For example, a screen (an example of a count screen) displaying the remaining time can be displayed by the user pressing the maintenance button 64 (an example of a transition button) on the main menu screen (refer to FIGS. 8A and 8B).

If the user selects "YES" on the screen illustrated in FIG. 18A, the command communication unit 92 transmits a reset signal to the command communication unit 82 of the image forming apparatus 1. In contrast, if the user selects "NO", a reset signal is not transmitted from the command communication unit 92 to the command communication unit 82. In other words, the timer 202 continues to count a value.

Figure 18B:
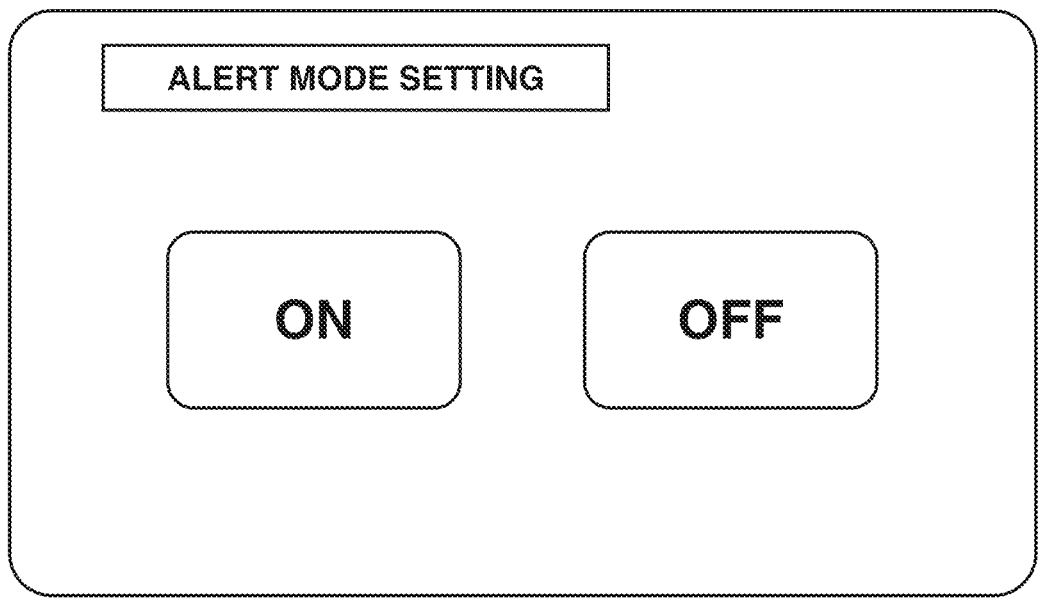

The user can also set whether to set an alert mode being a mode in which the alert screen is displayed (FIG. 18B).

Figure 19:
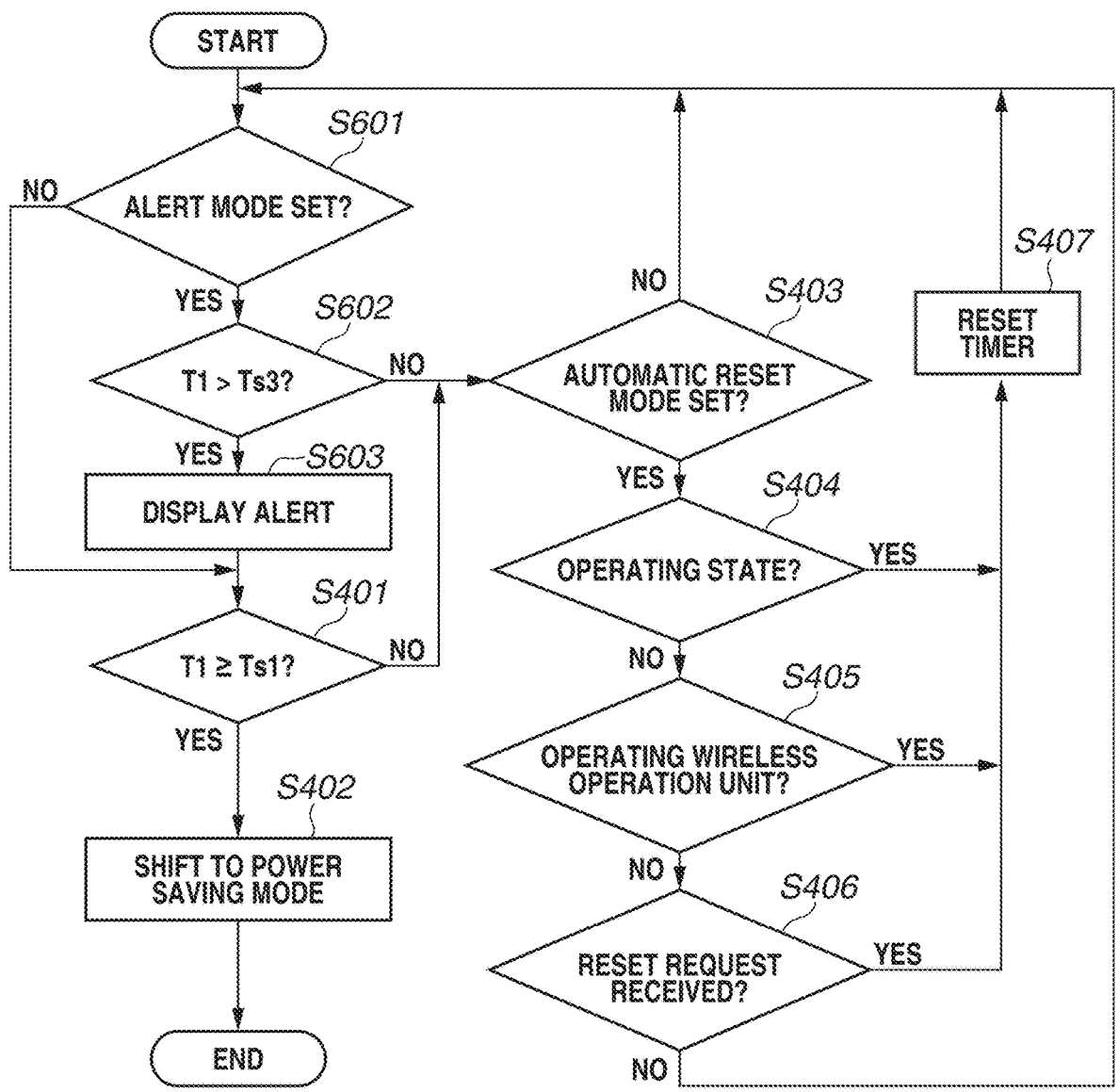
FIG. 19 is a flowchart illustrating an example of a shift sequence to a sleep mode according to one embodiment.

FIG. 19 is a flowchart illustrating a power saving mode shift sequence of the image forming apparatus 1 having the alert mode. The same processing flow as that in the flowchart described with reference to FIG. 15 is assigned the same step number, and the description will be omitted.

In step S601, the CPU 11 determines whether the alert mode is set. If the alert mode is not set (NO in step S601), the CPU 11 advances the processing to a processing flow in step S401. In contrast, if the alert mode is set (YES in step S601), the processing proceeds to step S602. In step S602, the CPU 11 refers to a count value T1 of the timer 202, and compares the count value T1 with a preset alert display time Ts3. A time shorter than the power saving mode shift time is set as the alert display time Ts3. In other words, when the timer 202 performs counting, a count value initially reaches the alert display time Ts3, and then reaches the power saving mode shift time Ts1.

If the CPU 11 determines that the count value T1 exceeds the alert display time Ts3 (YES in step S602), the processing proceeds to step S603. In step S603, the CPU 11 issues an instruction, to the command communication unit 82, to transmit an alert signal to the command communication unit 92 of the wireless operation unit 50. Upon receiving the alert signal, the CPU 21 displays the alert screen on the display 51. In contrast, if the CPU 11 determines that the count value T1 does not exceed the alert display time Ts3 (NO in step S602), the CPU 11 advances the processing to a processing flow in step S403.

As described above, the image forming system A according to the present example embodiment can operate in four modes (refer to FIG. 20) i.e., the standby mode, the power saving mode, the light sleep mode, and the deep sleep mode. In recent years, energy saving of electronic devices has been further demanded for preserving the earth environment. Thus, image forming apparatuses are also required to enter a power saving state as far as possible in an unused situation. For example, the International Energy Star Program is one of energy saving systems of office devices. Making efforts to meet the standard defined by the program contributes to preservation of the earth environment. In the deep sleep mode, power saving of an apparatus can be achieved as far as possible. For example, stopping the power supply to the wireless communication unit 81 can save the power of about 0.3 w. In this manner, by continuing power saving of various components, power saving of the entire apparatus can be achieved.

On the other hand, the productivity of an apparatus is desired to be improved as much as possible. By providing the light sleep mode, the image forming system A according to the present example embodiment realizes a configuration that can perform wireless communication from the wireless operation unit 50 while realizing a configuration of saving power consumption as far as possible.

If an amount of power to be supplied for operating the wireless communication unit 81 and an amount of power to be supplied for operating the image forming unit 15 are compared, the amount of power to be supplied to the image forming unit 15 is larger. For this reason, a configuration of providing the light sleep mode without providing the deep sleep mode can also be considered as a configuration that can perform wireless communication while saving power consumption although power consumption cannot be saved to the same extent as the deep sleep mode. Also with this configuration, a configuration that can perform wireless communication from the wireless operation unit 50 can be realized while realizing a configuration of saving power consumption.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-181045, filed Oct. 29, 2020, which is hereby incorporated by reference herein in its entirety.

What is claimed is:

1. An image forming apparatus including an image forming unit configured to form an image onto a sheet, receiving an execution signal for causing the image forming unit to execute image formation, and being shiftable to a standby mode being a power state in which image formation is executable in accordance with reception of the execution signal, a light sleep mode in which power consumption is smaller than that in the standby mode, and a deep sleep mode in which power consumption is smaller than that in the light sleep mode, the image forming apparatus comprising:
- a wireless operation device configured to receive an operation performed by a user, and wirelessly communicate with the image forming apparatus;
- a wireless communication unit configured to wirelessly communicate with the wireless operation device:
- a power source configured to supply power to the image forming unit and the wireless communication unit; and
- a power control unit configured to be driven by power supplied from the power source, and control supply of power from the power source to the image forming unit and the wireless communication unit,
- wherein, (1) in a case where the image forming apparatus is in the standby mode or the light sleep mode, the power control unit causes the power source to supply power to the wireless communication unit, and (2) in a case where the image forming apparatus is in the deep sleep mode, the power control unit causes the power source not to supply power to the wireless communication unit.

2. The image forming apparatus according to claim 1,
- wherein, in the light sleep mode, the wireless operation device can issue, via wireless communication, a shift instruction being an instruction to shift the image forming apparatus from the light sleep mode to the standby mode, and
- wherein, in accordance with a time in which an instruction to cause the image forming unit to execute image formation is not issued in the standby mode exceeding a predetermined time, the image forming apparatus shifts from the standby mode to the light sleep mode, and in accordance with a time in which the shift instruction is not issued in the light sleep mode exceeding a predetermined time, the image forming apparatus shifts from the light sleep mode to the deep sleep mode.

3. The image forming apparatus according to claim 2,
- wherein the wireless operation device includes a display unit configured to receive image formation information being information regarding image formation, from the wireless communication unit via wireless communication, and display the received image formation information, and
- wherein the wireless operation device announces that the image forming apparatus is to shift from the light sleep mode to the deep sleep mode, in accordance with a predetermined time elapsing in a state in which the image forming apparatus is in the light sleep mode.

4. The image forming apparatus according to claim 3, wherein the display unit performs the announcement by displaying an announcement screen displaying that the image forming apparatus is to shift from the light sleep mode to the deep sleep mode.

5. The image forming apparatus according to claim 3, wherein the display unit performs the announcement by displaying a time until the image forming apparatus shifts from the light sleep mode to the deep sleep mode.

6. The image forming apparatus according to claim 5, wherein the display unit can display a transition button for transitioning to a count screen being a screen for displaying a time until the image forming apparatus shifts from the light sleep mode to the deep sleep mode.

7. The image forming apparatus according to claim 1, further comprising a fixed operation unit including a display panel configured to display information regarding image formation, and a touch panel for receiving a touch operation performed by a user, and being fixed to the image forming apparatus,
- wherein, in a case where the image forming apparatus is in the standby mode, the power control unit causes the power source to supply power to the display panel and the touch panel, and
- wherein, in a case where the image forming apparatus is in the light sleep mode or the deep sleep mode, the power control unit causes the power source not to supply power to the display panel, and causes the power source to supply power to the touch panel.

8. The image forming apparatus according to claim 1, wherein the wireless communication is Wireless Fidelity (Wi-Fi) Direct communication.

9. An image forming apparatus including an image forming unit configured to form an image onto a sheet, receiving an execution signal for causing the image forming unit to execute image formation, and being shiftable to a standby mode being a power state in which image formation is executable in accordance with reception of the execution signal, and a light sleep mode in which power consumption is smaller than that in the standby mode, the image forming apparatus comprising:
- a wireless operation device configured to receive an operation performed by a user, and wirelessly communicate with the image forming apparatus;
- a wireless communication unit configured to wirelessly communicate with the wireless operation device:
- a power source configured to supply power to the image forming unit and the wireless communication unit; and
- a power control unit configured to be driven by power supplied from the power source, and control supply of power from the power source to the image forming unit and the wireless communication unit,
- wherein, (1) in a case where the image forming apparatus is in the standby mode, the power control unit causes the power source to supply power to the image forming unit and the wireless communication unit, and (2) in a case where the image forming apparatus is in the light sleep mode, the power control unit causes the power source not to supply power to the image forming unit, and causes the power source to supply power to the wireless communication unit.

10. The image forming apparatus according to claim 9,
- wherein the image forming apparatus is shiftable to a deep sleep mode in which power consumption is smaller than that in the light sleep mode, and
- wherein, in a case where the image forming apparatus is in the deep sleep mode, the power control unit causes the power source not to supply power to the image forming unit, and causes the power source not to supply power to the wireless communication unit.

11. The image forming apparatus according to claim 9, wherein the wireless communication is Wireless Fidelity (Wi-Fi) Direct communication.

* * * * *